US010411805B2

(12) United States Patent
Sabat, Jr. et al.

(10) Patent No.: US 10,411,805 B2
(45) Date of Patent: Sep. 10, 2019

(54) SYSTEMS AND METHODS OF OPTICAL PATH PROTECTION FOR DISTRIBUTED ANTENNA SYSTEMS

(71) Applicant: CommScope Technologies LLC, Hickory, NC (US)

(72) Inventors: John Sabat, Jr., Merrimack, NH (US); Thomas G. Hebert, Merrimack, NH (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/838,170

(22) Filed: Dec. 11, 2017

(65) Prior Publication Data
US 2018/0102848 A1 Apr. 12, 2018

Related U.S. Application Data

(60) Continuation of application No. 14/447,837, filed on Jul. 31, 2014, now Pat. No. 9,843,391, which is a
(Continued)

(51) Int. Cl.
*H04B 10/00* (2013.01)
*H04B 10/2575* (2013.01)
*H04B 10/112* (2013.01)

(52) U.S. Cl.
CPC ... *H04B 10/25752* (2013.01); *H04B 10/1127* (2013.01)

(58) Field of Classification Search
CPC .......... H04B 10/25752; H04B 10/1127; H04J 14/023
See application file for complete search history.

(56) References Cited

U.S. PATENT DOCUMENTS

| 4,183,054 A | 1/1980 | Patisaul et al. |
| 4,451,916 A | 5/1984 | Casper et al. |

(Continued)

FOREIGN PATENT DOCUMENTS

| DE | 3707244 C2 | 1/1990 |
| EP | 0391597 A2 | 10/1990 |

(Continued)

OTHER PUBLICATIONS

"Tektronix Synchronous Optical Network (SONET)", "http://www.iec.org/online/tutorials/sonet/topic03.html", Aug. 28, 2002, pp. 1-5, Publisher: International Engineering Consortium.
(Continued)

*Primary Examiner* — Dzung D Tran
(74) *Attorney, Agent, or Firm* — Fogg & Powers LLC

(57) ABSTRACT

Systems and methods for optical path protection for distributed antenna systems are provided. In one embodiment, a system comprises a hub and at least one node located remotely from the hub. The hub is coupled to the node by first and second fiber paths, the first fiber path comprising an uplink fiber and a downlink fiber, the second fiber path comprising an uplink fiber and a downlink fiber. The node is coupled to the downlink fibers of the first and second fiber paths via an optical combiner, and is further coupled to the uplink fibers of the first and second fiber paths via an optical splitter. The node further monitors a signal quality of a downlink optical signal and communicates to the hub information indicative of the signal quality. The hub switches communications between the hub and the node from the first to second fiber path based on the information.

21 Claims, 6 Drawing Sheets

Related U.S. Application Data continuation of application No. 13/353,758, filed on Jan. 19, 2012, now Pat. No. 8,805,182, which is a continuation of application No. 12/862,042, filed on Aug. 24, 2010, now Pat. No. 8,135,273, which is a division of application No. 11/380,798, filed on Apr. 28, 2006, now Pat. No. 7,805,073.

(56) References Cited

U.S. PATENT DOCUMENTS

| | | |
|---|---|---|
| 4,611,323 A | 9/1986 | Hessenmuller |
| 4,628,501 A | 12/1986 | Loscoe |
| 4,654,843 A | 3/1987 | Roza et al. |
| 4,667,319 A | 5/1987 | Chum |
| 4,691,292 A | 9/1987 | Rothweiler |
| 4,760,573 A | 7/1988 | Calvignac et al. |
| 4,813,054 A | 3/1989 | Plumb |
| 4,999,831 A | 3/1991 | Grace |
| 5,193,109 A | 3/1993 | Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,566,168 A | 10/1996 | Dent |
| 5,577,029 A | 11/1996 | Lu et al. |
| 5,592,470 A | 1/1997 | Rudrapatna et al. |
| 5,603,080 A | 2/1997 | Kallander et al. |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,682,403 A | 10/1997 | Tu et al. |
| 5,708,961 A | 1/1998 | Hylton et al. |
| D391,967 S | 3/1998 | Blais et al. |
| D391,968 S | 3/1998 | Shiozaki |
| 5,732,076 A | 3/1998 | Ketseoglou et al. |
| 5,734,699 A | 3/1998 | Lu et al. |
| 5,734,979 A | 3/1998 | Lu et al. |
| 5,739,933 A * | 4/1998 | Dembeck ............ H04Q 11/0003 398/45 |
| 5,761,195 A | 6/1998 | Lu et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Kaay et al. |
| 5,781,541 A | 7/1998 | Schneider |
| 5,781,582 A | 7/1998 | Sage et al. |
| 5,781,859 A | 7/1998 | Beasley |
| 5,781,865 A | 7/1998 | Gammon |
| D397,693 S | 9/1998 | Blais et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,818,824 A | 10/1998 | Lu et al. |
| 5,822,324 A | 10/1998 | Kostresti et al. |
| 5,831,752 A * | 11/1998 | Cotter ................ H04B 10/299 398/54 |
| 5,842,138 A | 11/1998 | Lu et al. |
| 5,852,651 A | 12/1998 | Fischer et al. |
| 5,878,325 A | 3/1999 | Dail |
| 5,883,882 A | 3/1999 | Schwartz |
| 5,887,256 A | 3/1999 | Lu et al. |
| 5,907,544 A | 5/1999 | Rypinski |
| 5,930,682 A | 7/1999 | Schwartz et al. |
| 5,946,622 A | 8/1999 | Bojeryd |
| 5,953,651 A | 9/1999 | Lu et al. |
| 5,969,837 A | 10/1999 | Farber et al. |
| 5,983,070 A | 11/1999 | Georges et al. |
| 5,987,014 A | 11/1999 | Magill et al. |
| 5,995,256 A | 11/1999 | Fee |
| 5,999,813 A | 12/1999 | Lu et al. |
| 6,005,884 A | 12/1999 | Cook et al. |
| 6,014,546 A | 1/2000 | Georges et al. |
| 6,034,950 A | 3/2000 | Sauer et al. |
| 6,078,823 A | 6/2000 | Chavez et al. |
| 6,081,716 A | 6/2000 | Lu |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,147,786 A | 11/2000 | Pan |
| 6,157,659 A | 12/2000 | Bird |
| 6,157,810 A | 12/2000 | Georges et al. |
| 6,169,907 B1 | 1/2001 | Chang et al. |
| 6,173,177 B1 | 1/2001 | Lu et al. |
| 6,181,687 B1 | 1/2001 | Bisdikian |
| 6,188,693 B1 | 2/2001 | Murakami |
| 6,198,558 B1 | 3/2001 | Graves et al. |
| 6,212,395 B1 | 4/2001 | Lu et al. |
| 6,222,660 B1 | 4/2001 | Traa |
| 6,226,274 B1 | 5/2001 | Reese et al. |
| 6,262,981 B1 | 7/2001 | Schmutz |
| 6,269,255 B1 | 7/2001 | Waylett |
| 6,275,990 B1 | 8/2001 | Dapper et al. |
| 6,317,884 B1 | 11/2001 | Eames et al. |
| 6,337,754 B1 | 1/2002 | Imajo |
| 6,353,600 B1 | 3/2002 | Schwartz et al. |
| 6,362,905 B1 | 3/2002 | Fukashiro et al. |
| 6,362,908 B1 | 3/2002 | Kimbrough et al. |
| 6,373,887 B1 | 4/2002 | Aiyagari et al. |
| 6,377,640 B2 | 4/2002 | Trans |
| 6,381,463 B1 | 4/2002 | Tu et al. |
| 6,466,572 B1 | 10/2002 | Ethridge et al. |
| 6,480,551 B1 | 11/2002 | Ohishi et al. |
| 6,486,907 B1 | 11/2002 | Farber et al. |
| 6,493,117 B1 | 12/2002 | Milton et al. |
| 6,498,936 B1 | 12/2002 | Raith |
| 6,504,831 B1 | 1/2003 | Greenwood et al. |
| 6,529,300 B1 | 3/2003 | Milton et al. |
| 6,535,732 B1 | 3/2003 | McIntosh et al. |
| 6,549,772 B1 | 4/2003 | Chavez et al. |
| 6,553,111 B1 | 4/2003 | Wang |
| 6,556,551 B1 | 4/2003 | Schwartz |
| 6,567,473 B1 | 5/2003 | Tzannes |
| 6,580,530 B1 | 6/2003 | Arecco et al. |
| 6,580,924 B1 | 6/2003 | Lu et al. |
| 6,594,496 B2 | 7/2003 | Schwartz |
| 6,597,912 B1 | 7/2003 | Lu et al. |
| 6,626,590 B1 | 9/2003 | Nagatsu et al. |
| 6,631,018 B1 | 10/2003 | Milton et al. |
| 6,640,108 B2 | 10/2003 | Lu et al. |
| 6,643,041 B1 | 11/2003 | Ikeda et al. |
| 6,658,259 B2 | 12/2003 | McIntosh |
| 6,667,973 B1 | 12/2003 | Gorshe et al. |
| 6,674,966 B1 | 1/2004 | Koonen |
| 6,675,004 B1 | 1/2004 | Waylett |
| 6,694,134 B1 | 2/2004 | Lu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,734,699 B1 | 5/2004 | Herr et al. |
| 6,748,174 B2 | 6/2004 | Milton et al. |
| 6,751,418 B2 | 6/2004 | Milton et al. |
| 6,757,498 B2 | 6/2004 | Milton et al. |
| 6,768,745 B1 | 7/2004 | Gorshe et al. |
| 6,771,933 B1 | 8/2004 | Eng et al. |
| 6,775,479 B2 | 8/2004 | Milton et al. |
| 6,785,558 B1 | 8/2004 | Stratford et al. |
| 6,795,652 B2 | 9/2004 | Milton et al. |
| 6,798,934 B2 | 9/2004 | Parry et al. |
| 6,798,991 B1 * | 9/2004 | Davis ................ H04J 14/0227 398/19 |
| 6,801,767 B1 | 10/2004 | Schwartz et al. |
| 6,813,445 B2 | 11/2004 | Fukashiro et al. |

(56) References Cited

U.S. PATENT DOCUMENTS

| | | |
|---|---|---|
| 6,826,163 B2 | 11/2004 | Mani et al. |
| 6,826,164 B2 | 11/2004 | Mani et al. |
| 6,829,477 B1 | 12/2004 | Lu et al. |
| 6,831,901 B2 | 12/2004 | Millar |
| 6,847,653 B1 | 1/2005 | Smiroldo |
| 6,865,390 B2 | 3/2005 | Goss et al. |
| 6,892,032 B2 | 5/2005 | Milton et al. |
| 6,907,048 B1 | 6/2005 | Treadaway et al. |
| 6,912,409 B2 | 6/2005 | Waylett |
| 6,917,614 B1 | 7/2005 | Laubach et al. |
| 6,931,261 B2 | 8/2005 | Waylett et al. |
| 6,963,552 B2 | 11/2005 | Sabat et al. |
| 6,978,934 B2 | 12/2005 | Feng |
| 6,990,067 B2 | 1/2006 | Kaspit et al. |
| 7,035,671 B2 | 4/2006 | Solum |
| 7,127,175 B2 | 10/2006 | Mani et al. |
| 7,205,864 B2 | 4/2007 | Schultz et al. |
| 7,209,442 B1 | 4/2007 | Chapman |
| 7,215,651 B2 | 5/2007 | Millar |
| 7,289,972 B2 | 10/2007 | Rieser et al. |
| 7,805,073 B2 | 9/2010 | Sabat, Jr. et al. |
| 8,135,273 B2 | 3/2012 | Sabat, Jr. et al. |
| 8,805,182 B2 | 8/2014 | Sabat, Jr. et al. |
| 9,843,391 B2 | 12/2017 | Sabat, Jr. et al. |
| 2002/0071392 A1 | 6/2002 | Grover et al. |
| 2002/0072329 A1 | 6/2002 | Bandeira et al. |
| 2002/0075906 A1* | 6/2002 | Cole ............... H04B 10/25756 370/535 |
| 2002/0093712 A1 | 7/2002 | Fukashiro et al. |
| 2002/0097462 A1 | 7/2002 | Koyano et al. |
| 2002/0106146 A1 | 8/2002 | Lauder et al. |
| 2002/0126350 A1 | 9/2002 | Sato et al. |
| 2002/0126352 A1 | 9/2002 | Shake et al. |
| 2002/0167954 A1 | 11/2002 | Highsmith et al. |
| 2002/0180957 A1 | 12/2002 | Lauder et al. |
| 2002/0181037 A1 | 12/2002 | Lauder et al. |
| 2002/0186429 A1 | 12/2002 | Kaspit et al. |
| 2002/0186439 A1 | 12/2002 | BuAbbud et al. |
| 2002/0191565 A1 | 12/2002 | Mani et al. |
| 2003/0015943 A1 | 1/2003 | Kim et al. |
| 2003/0040335 A1 | 2/2003 | McIntosh et al. |
| 2003/0043821 A1 | 3/2003 | Bosch et al. |
| 2003/0043928 A1 | 3/2003 | Ling et al. |
| 2003/0076560 A1* | 4/2003 | Pratt ............... H04B 10/27 398/79 |
| 2003/0099032 A1 | 5/2003 | Asao et al. |
| 2003/0108271 A1 | 6/2003 | Parry et al. |
| 2003/0143947 A1 | 7/2003 | Lyu |
| 2003/0169470 A1 | 9/2003 | Alagar et al. |
| 2003/0189920 A1 | 10/2003 | Erami et al. |
| 2003/0194232 A1 | 10/2003 | Arecco et al. |
| 2003/0231376 A1 | 12/2003 | Horachi et al. |
| 2004/0010609 A1 | 1/2004 | Vilander et al. |
| 2004/0037565 A1 | 2/2004 | Young et al. |
| 2004/0052520 A1 | 3/2004 | Halgren et al. |
| 2004/0114925 A1 | 6/2004 | Berthold et al. |
| 2004/0198453 A1 | 10/2004 | Cutrer et al. |
| 2004/0208547 A1 | 10/2004 | Sabat et al. |
| 2004/0219950 A1 | 11/2004 | Pallonen et al. |
| 2004/0240485 A1 | 12/2004 | Lipski et al. |
| 2005/0007993 A1 | 1/2005 | Chambers et al. |
| 2005/0025481 A1 | 2/2005 | Fukashiro et al. |
| 2005/0088999 A1 | 4/2005 | Waylett et al. |
| 2005/0147067 A1 | 7/2005 | Mani et al. |
| 2005/0153712 A1 | 7/2005 | Osaka et al. |
| 2005/0201323 A1 | 9/2005 | Mani et al. |
| 2005/0250503 A1 | 11/2005 | Cutrer |
| 2005/0276605 A1 | 12/2005 | Pain et al. |
| 2006/0018656 A1 | 1/2006 | Nogi et al. |
| 2006/0121944 A1 | 6/2006 | Buscaglia et al. |
| 2006/0193295 A1 | 8/2006 | White et al. |
| 2006/0216028 A1 | 9/2006 | Ozawa |
| 2008/0014948 A1 | 1/2008 | Scheinert |
| 2008/0058018 A1 | 3/2008 | Scheinert |
| 2008/0232799 A1 | 9/2008 | Kim |

FOREIGN PATENT DOCUMENTS

| | | |
|---|---|---|
| EP | 0664621 A1 | 7/1995 |
| EP | 0876073 A2 | 11/1998 |
| GB | 2253770 A | 9/1992 |
| GB | 2289198 A | 11/1995 |
| GB | 2315959 A | 2/1998 |
| GB | 2320653 A | 6/1998 |
| WO | 9115927 A1 | 10/1991 |
| WO | 9533350 A1 | 12/1995 |
| WO | 9628946 A1 | 9/1996 |
| WO | 9716000 A1 | 5/1997 |
| WO | 9732442 A1 | 9/1997 |
| WO | 9824256 A2 | 6/1998 |
| WO | 9937035 A1 | 7/1999 |
| WO | 0174013 A2 | 10/2001 |
| WO | 0174100 A1 | 10/2001 |

OTHER PUBLICATIONS

Akos et al., "Direct Bandpass Sampling of Multiple Distinct RF Signals", Jul. 1, 1999, pp. 983-988, vol. 47, Publisher: IEEE Transactions on Communications.

Foxcom Wireless Properietary Information, "Litenna In-Building RF Distribution System", 1998, pp. 1-8.

Foxcom Wireless Proprietary Information, "Application Note RFIBER-RF Fiberoptic Links for Wireless Applications", 1998, pp. 3-11.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

Nakatsugawa et al., "Software Radio Base and Personal Stations for Cellular/PCS Systems", 2000, pp. 617-621, Publisher: IEEE.

U.S.Patent Office, "Restriction Requirement", "from U.S. Appl. No. 11/380,798", dated Mar. 9, 2009, pp. 1-4, Published in: US.

United States Patent and Trademark Office, "Advisory Action", "From U.S. Appl. No. 13/353,758", dated Feb. 28, 2014, pp. 1-3, Published in: US.

United States Patent and Trademark Office, "Advisory Action", "From U.S. Appl. No. 14/447,837", dated Sep. 15, 2016, pp. 1-4, Published in: US.

United States Patent and Trademark Office, "Advisory Action", "From U.S. Appl. No. 14/447,837", dated Sep. 20, 2016, pp. 1-2, Published in: US.

United States Patent and Trademark Office, "Final Office Action", "From U.S. Appl. No. 11/380,798", dated Jun. 12, 2009, pp. 1-13, Published in: US.

United States Patent and Trademark Office, "Final Office Action", "From U.S. Appl. No. 13/353,758", dated Dec. 18, 2013, pp. 1-11, Published in: US.

United States Patent and Trademark Office, "Final Office Action", "From U.S. Appl. No. 14/447,837", dated Jun. 7, 2016, pp. 1-11, Published in: US.

United States Patent and Trademark Office, "Notice of Allowance", "From U.S. Appl. No. 11/380,798", dated Jun. 23, 2010, pp. 1-19, Published in: US.

United States Patent and Trademark Office, "Notice of Allowance", "From U.S. Appl. No. 12/862,042", dated Feb. 3, 2012, pp. 1-9, Published in: US.

United States Patent and Trademark Office, "Notice of Allowance", "From U.S. Appl. No. 12/862,042", dated Nov. 15, 2011, pp. 1-28, Published in: US.

United States Patent and Trademark Office, "Notice of Allowance", "From U.S. Appl. No. 13/353,758", dated Apr. 2, 2014, pp. 1-5, Published in: US.

United States Patent and Trademark Office, "Notice of Allowance", "From U.S. Appl. No. 14/447,837", dated Apr. 12, 2017, pp. 1-5, Published in: US.

(56) References Cited

OTHER PUBLICATIONS

United States Patent and Trademark Office, "Notice of Allowance", "From U.S. Appl. No. 14/447,837", dated Aug. 10, 2017, pp. 1-10, Published in: US.
United States Patent and Trademark Office, "Office Action", "From U.S. Appl. No. 11/380,798", dated Aug. 26, 2009, pp. 1-10, Published in: US.
United States Patent and Trademark Office, "Office Action", "From U.S. Appl. No. 11/380,798", dated Feb. 1, 2010, pp. 1-10, Published in: US.
United States Patent and Trademark Office, "Office Action", "From U.S. Appl. No. 11/380,798", dated Oct. 7, 2008, pp. 1-24, Published in: US.
United States Patent and Trademark Office, "Office Action", "From U.S. Appl. No. 12/862,042", dated May 25, 2011, pp. 1-37, Published in: US.
United States Patent and Trademark Office, "Office Action", "From U.S. Appl. No. 13/353,758", dated Jul. 9, 2013, pp. 1-35, Published in: US.
United States Patent and Trademark Office, "Office Action", "From U.S. Appl. No. 14/447,837", dated Jul. 6, 2015, pp. 1-22, Published in: US.
United States Patent and Trademark Office, "Office Action", "From U.S. Appl. No. 14/447,837", dated Oct. 6, 2016, pp. 1-11, Published in: US.
United States Patent and Trademark Office, "Office Action", "From U.S. Appl. No. 14/447,837", dated Dec. 30, 2015, pp. 1-31, Published in: US.
Wala, "A New Microcell Architecture Using Digital Optical Transport", "Freedom Through Wireless Technogolgy", May 18, 1993, pp. 585-588, Publisher: Proceedings of the Vehicular Technology Conference, New York, IEEE, Published in: US.

* cited by examiner

SYSTEMS AND METHODS OF OPTICAL PATH PROTECTION FOR DISTRIBUTED ANTENNA SYSTEMS

CROSS REFERENCES TO RELATED APPLICATIONS

This application is a continuation of, and claims benefit to, application Ser. No. 14/447,837 filed on Jul. 31, 2014, entitled "SYSTEMS AND METHODS OF OPTICAL PATH PROTECTION FOR DISTRIBUTED ANTENNA SYSTEMS", which is a continuation of application Ser. No. 13/353,758 filed on Jan. 19, 2012, entitled "SYSTEMS AND METHODS OF OPTICAL PATH PROTECTION FOR DISTRIBUTED ANTENNA SYSTEMS", which is a continuation of application Ser. No. 12/862,042 filed on Aug. 24, 2010, entitled "SYSTEMS AND METHODS OF OPTICAL PATH PROTECTION FOR DISTRIBUTED ANTENNA SYSTEMS", which is a divisional of application Ser. No. 11/380,798 filed on Apr. 28, 2006, entitled "SYSTEMS AND METHODS OF OPTICAL PATH PROTECTION FOR DISTRIBUTED ANTENNA SYSTEMS", each of which are hereby incorporated herein by reference.

BACKGROUND

Fiber breaks and/or degradation in a fiber feeding a distributed antenna system (DAS) network can have a large impact on a system's availability. Network operators typically look for a high-degree of network availability (for example, "0.9999" or higher). A network availability of 0.9999 requires a network be unavailable for no more than 1 hour per year, whereas a network availability of 0.99999 requires a network be unavailable for no more than 1 hour every ten years. One fiber break that causes a DAS network to be unavailable for 10 hours while the fiber break is isolated and repaired would lower availability to 0.999. Oftentimes fiber breaks take even longer to isolate and repair.

Adverse changes to a fiber-based network can happen in many different ways. Examples include digging near fiber optic cabling that causes damage to fiber, damaging the cable by a maintenance worker stepping on, bending, or breaking a fiber. Aerial-mounted fiber can be damaged during accidents involving the poles hanging the fiber. Optical connectors can become degraded by damage and/or dirt. These are just a few of the fiber degradation scenarios, any of which can cause degraded or loss of service on that fiber for extended periods of time. Due to the time required to isolate and repair fibers, redundant paths are often used in order to keep the system up as much as possible. Since fiber damage tends to be a local event, redundant fibers are usually run via completely different paths. In this way, any local damage done to the fiber does not affect the redundant path. In one application of a DAS network that makes use of redundant fibers, both a hub and remote node connected by the redundant fibers includes active switching devices in order to switch from a primary fiber to a secondary fiber in the event of a break (or other degradation of the primary fiber). However, remote nodes are often located in isolated areas with limited power resources and space for accommodating optical switching equipment.

SUMMARY

In one embodiment, a system is provided. The system comprises a hub; at least one remote node that is located remotely from the hub; wherein the hub communicates with the at least one remote node via either one of a primary fiber path and a backup fiber path, the primary fiber path comprising an uplink fiber and a downlink fiber and the backup fiber path comprising an uplink fiber and a downlink fiber; wherein the at least one remote node is coupled to the downlink fiber of the primary fiber path and the downlink fiber of the backup fiber path via an optical combiner; wherein the at least one remote node is further coupled to the uplink fiber of the primary fiber path and the uplink fiber of the backup fiber path via an optical splitter; and wherein the hub switches from communicating with the at least one remote node on the primary fiber path to communicating with the at least one remote node on the backup fiber path based on an uplink optical signal received from the at least one remote node.

DETAILED DESCRIPTION

Figure 1:
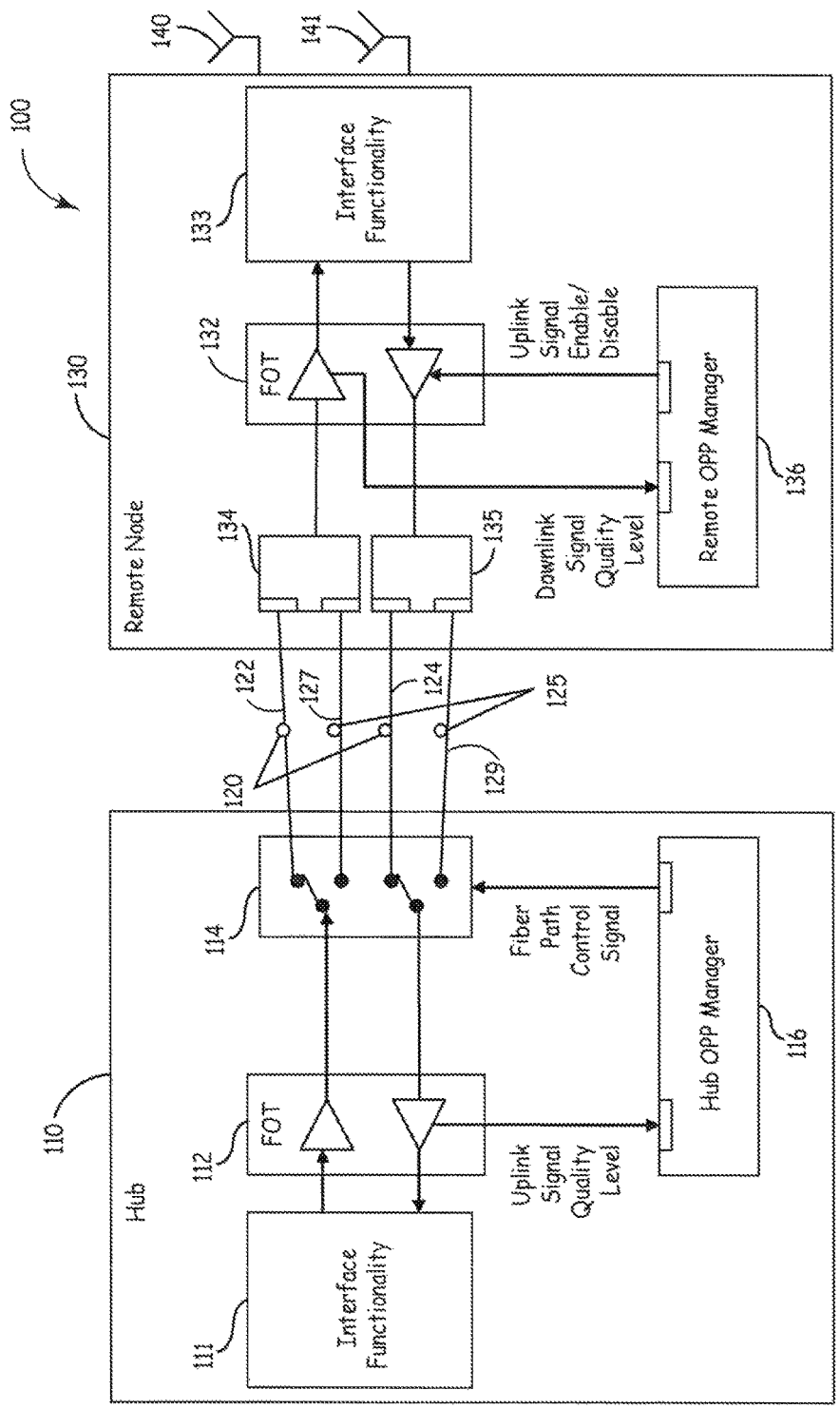
FIG. 1 is a block diagram of one embodiment of a distributed antenna system.

FIG. 1 is a block diagram of one embodiment of a distributed antenna system (DAS) 100. DAS 100 is often used in a wireless communication network (for example, a cellular wireless network) to communicatively couple one or more base stations (not shown in FIG. 1) to one or more antennas that are remotely located from the base stations (not shown in FIG. 1). DAS 100 includes a hub 110 located near the base stations and one or more remote access nodes 130 (also referred to here as "remote nodes" 130), each of which is located near one or more remote antennas (for example, a primary and diversity antenna). For the purposes of illustration, the DAS 100 comprises a single hub 110 that is optically coupled to single remote node 130 (though it is to be understood that in other embodiments other numbers of hubs 110 and/or remote nodes 130 are used). The hub 110 is optically coupled to the remote node 130 through a primary optical fiber path 120 and a backup optical fiber path 125. In the embodiment illustrated in FIG. 1, primary optical fiber path 120 includes a primary downlink optical fiber 122 and a primary uplink optical fiber 124. Backup optical fiber path 125 includes a secondary downlink optical fiber 127 and a secondary uplink optical fiber 129. In alternate embodiments, one or both of primary optical fiber path 120 and backup optical fiber path 125 include a plurality of uplink and/or downlink optical fibers.

Hub 110 comprises interface functionality 111 that couple the hub 110 to one or more base stations, a fiber optic transceiver 112 communicatively coupled to the one or more interface functionality 111, an optical switch 114 communicatively coupled to the fiber optic transceiver 112, primary optical fiber path 120 and backup optical fiber path 125, and a hub optical path protection (OPP) manager 116 communicatively coupled to the fiber optic transceiver 112 and the optical switch 114. In the downlink direction, the interface functionality 111 of the hub 110 receives analog downlink RF signals from the one or more base stations to which the hub 110 is communicatively coupled and provide the fiber optical transceiver 112 a suitable electrical signal for modulating onto a downlink optical carrier. The downlink optical signal output by the fiber optic transceiver 112 is selectively communicated to the remote node 130 on either the primary downlink optical fiber 122 or secondary downlink optical fiber 127 by the optical switch 114, depending on a fiber path control signal output by the hub optical path protection manager 116.

In one implementation of such an embodiment (also referred to here as a "digital-transport implementation"), the interface functionality 111 receives one or more analog downlink radio frequency (RF) signals from each of the base stations to which the hub 110 is communicatively coupled and digitizes at least a portion of the received analog downlink RF signal (for example, by digitizing a particular frequency band of the received analog downlink RF signal). Also, in such a digital-transport implementation, the interface functionality 111 combines at least a portion of the digitized downlink RF signals from one or more base stations into frames suitable for transmission on the primary downlink optical fiber 122 and/or the secondary downlink optical fiber 127 (for example, by formatting the at least a portion of the digitized downlink RF signals into SONET STS-48/OC-48 formatted frames). In such a digital-transport implementation, the fiber optic transceiver 112 digitally modulates the electrical signal (which comprises frames of digitized downlink RF signals) onto a downlink optical carrier in order to generate the downlink optical signal. An example of downlink functionality suitable for use in such a digital-transport implementation is described in U.S. Pat. No. 6,963,552, titled "MULTI-PROTOCOL DISTRIBUTED WIRELESS SYSTEM ARCHITECTURE" (also referred to here as the "'552 Patent"), which is hereby incorporated herein by reference.

In an alternative implementation of such an embodiment (also referred to here as an "analog-transport implementation"), the interface functionality 111 receives one or more analog downlink RF signals from each of the base stations to which the hub 110 is communicatively coupled and filters, combines, mixes, and/or splits the received analog downlink RF signals into a single electrical analog signal suitable for transmission on the primary downlink optical fiber 122 and/or the secondary downlink optical fiber 127. In such an analog-transport implementation, the fiber optic transceiver 112 amplitude modulates the single electrical analog signal received from the interface functionality 111 onto a downlink optical carrier in order to generate the downlink optical signal.

In the uplink direction, hub 110 receives an uplink optical signal from the remote node 130 on both of the primary uplink optical fiber 124 and the secondary uplink optical fiber 129. Optical switch 114 selectively couples one of the primary uplink optical fiber 124 and the secondary uplink optical fiber 129 to the fiber optic transceiver 112, depending on the fiber path control signal from the hub optical path protection manager 116. That is, when optical switch 114 selectively couples the primary uplink optical fiber 124 to the fiber optical transceiver 112, any uplink optical signal received on the primary uplink optical fiber 124 is communicated to the fiber optic transceiver 112 by the optical switch. Likewise, when optical switch 114 selectively couples the secondary uplink optical fiber 129 to the fiber optical transceiver 112, any uplink optical signal received on the secondary uplink optical fiber 129 is communicated to the fiber optic transceiver 112 by the optical switch. The fiber optic transceiver 112 demodulates the uplink optical signal in order to extract an electrical uplink RF signal, which is provided to one or more base stations via the interface functionality 111. In the digital-transport implementation of such an embodiment noted above, the extracted uplink RF signal comprises frames (for example, SONET STS-48/OC-48 formatted frames) containing digitized uplink RF signals, which the interface functionality 111 extracts from the frames and converts to analog uplink RF signals. The analog uplink RF signals, in such an embodiment, are provided to one or more base stations coupled to the hub 110. In the analog-transport implementation of such an embodiment noted above, the extracted uplink RF signal comprises an analog uplink RF signals that are provided to one or more base stations coupled to the hub 110.

Remote node 130 comprises an optical combiner 134, an optical splitter 135, a fiber optic transceiver 132, interface functionality 133, and a remote optical path protection (OPP) manager 136.

The optical combiner 134 of the remote node 130 receives downlink optical signals from hub 110 via one of either primary downlink optical fiber 122 or secondary downlink optical fiber 127. An optical "combiner", as the term is used in this specification, means a device that receives a plurality of optical signal inputs and combines the optical signals into a single optical output. The downlink optical signal is transmitted on only one of the primary downlink optical fiber 122 or the secondary downlink optical fiber 127 at any one time. For this reason, at any one time, only the selected one of the primary downlink optical fiber 122 or the secondary downlink optical fiber 127 is "lit" while the fiber not selected by optical switch 114 is "dark" and does not carry an optical signal. This eliminates concerns of optical interference at the optical combiner 134. The resulting output of optical combiner 134, which is essentially the combination of the downlink optical signal from the lit fiber with a null signal from the dark fiber, is thus simply the downlink optical signal. The output of the optical combiner 134 (that is, the downlink optical signal) is communicated via a single fiber to fiber optic transceiver 132. The fiber optic transceiver 132 demodulates the downlink optical signal in order to extract an electrical downlink RF signal, which is provided to one or more antennas 140 and 141 via the interface functionality 133. In the digital-transport implementation of such an embodiment noted above, the electrical downlink RF signal output by the fiber optic transceiver 132 comprises digitized downlink RF signals from one or more base stations. In such an implementation, the interface functionality 133 converts the digitized downlink RF signals into analog downlink RF signals (for example, using a suitable digital-to-analog conversion process), which are amplified for radiation from the one or more antennas 140 and 141. In one example, the digitized downlink RF signals from each of the base stations is separately converted into an individual analog downlink RF signal for that respective base station (for example, by respective "RAN slices" of the type described in the '552 Patent) and each of the individual analog downlink RF signals are thereafter combined for amplification and radiation from one or more of the antennas 140 and 141. In the analog-transport implementation of such an embodiment noted above, the electrical downlink RF signal output by the fiber optic transceiver 132 comprises analog downlink RF signals from one or more of base stations and the interface functionality 133 amplifies for radiation from the one or more antennas 140 and 141.

In the uplink direction, the interface functionality 133 of the remote node 130 receives analog uplink RF signals from the one or more antennas 140 and 141 coupled to the remote node 130. The interface functionality 133 provides the fiber optic transceiver 132 a suitable electrical signal for modulating onto an uplink optical carrier. The uplink optical signal output by the fiber optic transceiver 132 is communicated on both of primary uplink optical fiber 124 and secondary uplink optical fiber 129 by the optical splitter 135. An optical "splitter", as the term is used in this specification, means a device that replicates an optical signal received at an input to each of a plurality of outputs. That is, optical splitter 135 optically replicates the uplink optical signal output by the fiber optic transceiver 132 so that the uplink optical signal is communicated to hub 110 via both of the primary uplink optical fiber 124 and the secondary uplink optical fiber 129. In the digital-transport implementation of the embodiment shown in FIG. 1 noted above, the interface functionality 133 of the remote node 130 receives one or more analog uplink RF signals from each of the antennas 140 and 141 to which the remote node 130 is communicatively coupled and digitizes at least a portion of the received analog uplink RF signal (for example, by digitizing a particular frequency band of each analog uplink RF signal). Also, in such a digital-transport implementation, the interface functionality 133 combines at least a portion of the digitized uplink RF signals from one or more of the antennas 140 and 141 into frames suitable for transmission on the primary uplink optical fiber 124 and the secondary uplink optical fiber 129 (for example, by formatting the at least a portion of the digitized uplink RF signals into SONET STS-48/OC-48 formatted frames). In such a digital-transport implementation, the fiber optic transceiver 132 digitally modulates the electrical signal (which comprises frames of digitized uplink RF signals) onto an uplink optical carrier in order to generate the uplink optical signal.

Alternatively, in the analog-transport implementation of the embodiment shown in FIG. 1 noted above, the interface functionality 133 receives one or more analog uplink RF signals from each of the antennas 140 and 141 to which the remote node 130 is communicatively coupled and filters, combines, mixes, and/or splits the received analog uplink RF signals into a single analog signal suitable for transmission on the primary uplink optical fiber 124 and the secondary uplink optical fiber 129. In such an analog-transport implementation, the fiber optic transceiver 132 amplitude modulates the single electrical analog signal received from the interface functionality 133 onto an uplink optical carrier in order to generate the uplink optical signal, which is then communicated to the hub 110 on both the primary uplink optical fiber 124 and the secondary uplink optical fiber 129 via the splitter 135.

Under normal operating conditions, communications between hub 110 and remote node 130 are conducted over the primary optical fiber path 120. Normal operating conditions exist when communications between hub 110 and remote node 130 using the primary downlink optical fiber 122 and the primary uplink optical fiber 124 are accomplished within acceptable operating parameters discussed below.

The hub OPP manager (HOM) 116 determines when communications between hub 110 and remote node 130 via the primary fiber path 120 are within acceptable operating parameters. When HOM 116 determines that primary fiber path 120 is operating within acceptable operating parameters HOM 116 causes optical switch 114 to align itself for transmitting the downlink optical signal via the primary downlink optical fiber 122 and receiving the uplink optical signal from the primary uplink optical fiber 124 (the "normal state" of optical switch 114). When HOM 116 determines that communications via primary fiber path 120 are not within acceptable operating parameters, HOM 116 causes optical switch 114 to align itself for transmitting the downlink optical signal via the secondary downlink optical fiber 127 and to align itself for receiving the uplink optical signal from the secondary uplink optical fiber 129 (the "backup state" of optical switch 114).

HOM 116 determines when communications via primary fiber path 120 are not within acceptable operating parameters based on the uplink optical signal received on the primary uplink optical fiber 124.

In one implementation of DAS 100, fiber optic transceiver 112 communicates an uplink signal quality signal to HOM 116 (or other information indicative of an attribute of the uplink optical signal). When the uplink signal quality of the uplink optical signal degrades below a predetermined threshold level, HOM 116 switches optical switch 114 from its normal state to the backup state in order to utilize backup fiber path 125. In one implementation, fiber optic transceiver 112 communicates the bit error ratio (BER) of the uplink optical signal it receives. In such an implementation, when the BER drops below a predetermined threshold BER, HOM 116 switches optical switch 114 from its normal state to the backup state in order to utilize backup fiber path 125. As would be appreciated by one skilled in the art upon reading this specification, in a digital-transport implementation of a DAS 100, a typical good fiber path performs at better than a 10e-12 BER. Because of the amount of over-sampling typically used in such a digital-transport implementation, an optical fiber path can continue to operate down to as low as 10e-6 BER without adversely affecting call quality. In other implementations, other signal quality indicators, such as but not limited to optical power levels, are used to determine whether or not communications via primary fiber path 120 are within acceptable operating parameters. For example, in another implementation, fiber optic transceiver 112 measures and communicates the optical power level of the uplink optical signal it receives. In such an implementation, when the optical power level drops below a predetermined threshold power level, HOM 116 switches optical switch 114 from its normal state to the backup state in order to utilize backup fiber path 125.

Because hub 110 receives only the uplink optical signals, HOM 116 cannot directly determine the signal quality of downlink optical signals received by remote node 130. Therefore, information regarding the signal quality of downlink optical signals is communicated to HOM 116 by remote OPP manager (ROM) 136. In other embodiments, other information indicative of an attribute of the downlink optical signal is determined and communicated.

In one implementation, fiber optic transceiver 132 receives the downlink optical signal and communicates a downlink signal quality signal to ROM 136. In one implementation, fiber optic transceiver 132 communicates the bit error rate (BER) of the downlink optical signal it receives to ROM 136. In such an implementation, when the BER drops below a predetermined threshold level, ROM 136 reports the BER to HOM 116 so that HOM 116 can make the determination on whether to switch from the primary fiber path 120 to the backup fiber path 125. In other implementations, other signal quality indicators are used to determine whether or not communications via primary fiber path 120 are within acceptable operating parameters. When the downlink signal quality reported by ROM 136 degrades below a predetermined threshold level, HOM 116 switches optical switch 114 from its normal state to the backup state in order to utilize backup fiber path 125. For example, in another implementation, fiber optic transceiver 132 measures and communicates the optical power level of the downlink optical signal it receives. In such an implementation, when the optical power level drops below a predetermined threshold power level, ROM 136 reports the optical power level to HOM 116 so that HOM 116 can make the determination on whether to switch from the primary fiber path 120 to the backup fiber path 125.

As would be appreciated by one skilled in the art upon reading this specification, it is not necessary for uplink and downlink signal quality to be based on the same criteria. For example, in one implementation fiber optic transceiver 112 measures and communicates the optical power level of the uplink optical signal it receives while fiber optic transceiver 132 communicates the bit error rate (BER) of the downlink optical signal it receives. In another implementation fiber optic transceiver 112 communicates the bit error rate (BER) of the uplink optical signal it receives while fiber optic transceiver 132 communicates the optical power level of the downlink optical signal it receives.

In another implementation, ROM 136 makes the determination whether to switch communications from the primary fiber path 120 to the backup fiber path 125 based on the signal quality of the downlink optical signal, and alerts HOM 116 of a degraded downlink fiber path by shutting off the uplink fiber path. In one such implementation, when the BER of the downlink optical signal drops below the predetermined threshold level, ROM 136 disables fiber optic transceiver 132 from transmitting the uplink optical signal to hub 110. In another such implementation, when the optical power level of the downlink optical signal drops below the predetermined threshold level, ROM 136 disables fiber optic transceiver 132 from transmitting the uplink optical signal to hub 110. Fiber optic transceiver 112 detects this loss of the uplink optical signal and outputs an uplink signal quality signal that indicates the loss of the uplink optical signal. HOM 116 responds to what it perceives as a degraded uplink signal quality by switching optical switch 114 from its normal state to the backup state in order to utilize backup fiber path 125.

Figure 2:
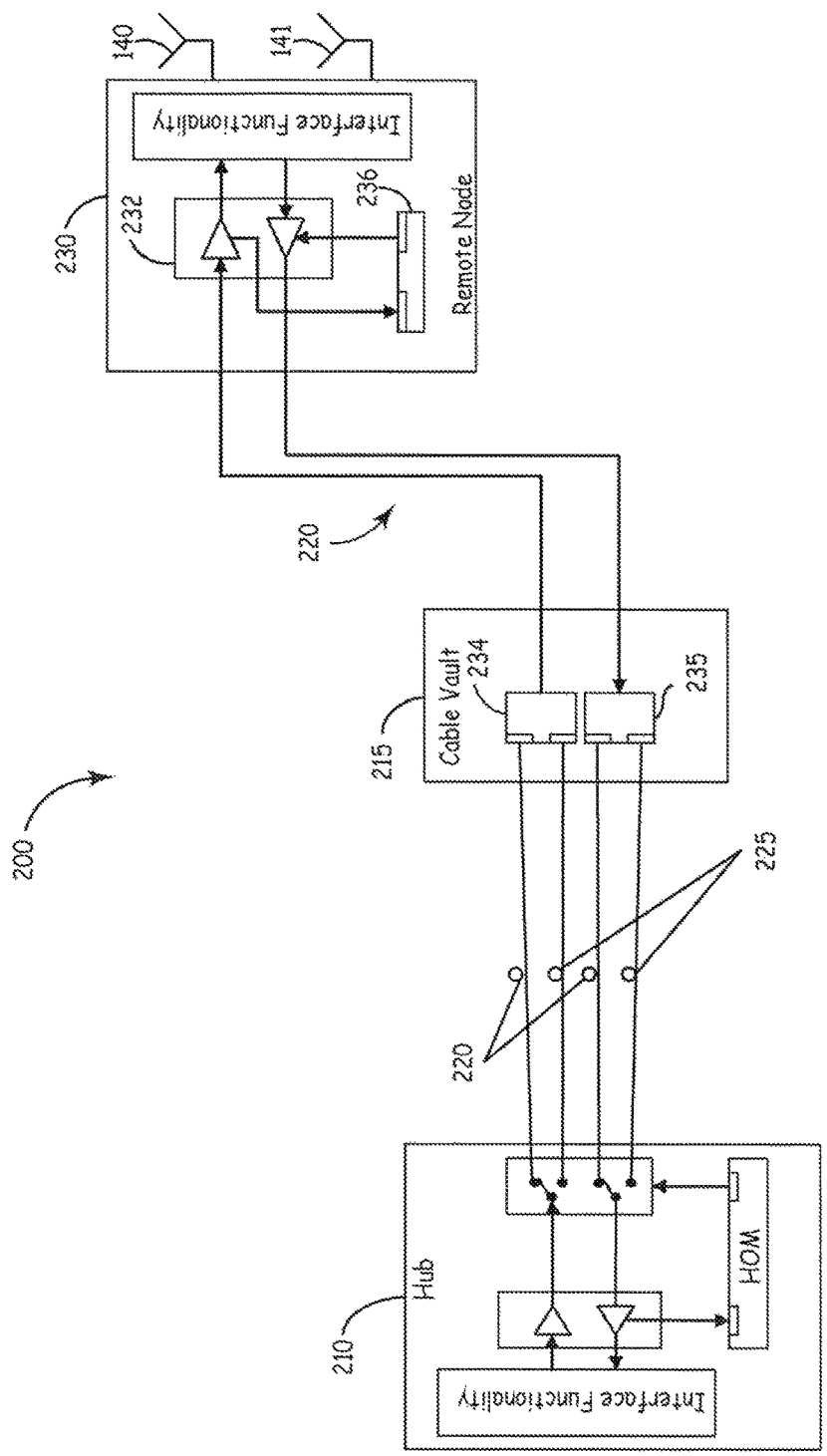
FIG. 2 is a block diagram of one embodiment of a distributed antenna system.

In the embodiment shown in FIG. 1, all the fiber switching is performed at the hub 110 rather than at remote node 130. The hub 110 contains all of the "active" optical path protection circuitry (that is, the optical switch 114) that is used to switch among the redundant fiber paths. The remote node 130 includes passive optical splitters and combiners that typically do not require significant space to install (space often being a scarce resource at remote node locations) and typically do not require addition power to operate (power often being a scarce resource at remote node locations). Further, when space is very limited within a remote node, the optical splitter and optical combiner need not be located within the remote node housing, but can be installed external to the remote node housing, as illustrated in the embodiment shown in FIG. 2. FIG. 2 illustrates a hub 210 coupled to an optical combiner 234 and an optical splitter 235 via a primary optical fiber path 220 and a backup fiber path 225. Hub 210 operates as described with respect to hub 110 shown in FIG. 1, transmitting downlink optical signals to optical combiner 234 and receiving uplink optical signals from optical splitter 235. As illustrated in FIG. 2, optical combiner 234 and optical splitter 235 are located in a housing 215 that is external to remote node 230. Optical combiner 234 and optical splitter 235 are coupled to the fiber optic transceiver 232 within remote node 230 via fiber pair 220. Because optical combiner 234 and optical splitter 235 do not require power to operate, housing 215 may comprise an underground cable vault or similar location where power is not available. Further, only a single fiber pair 220 needs to be run between housing 215 and the remote node 230, thus reducing system installation costs. A ROM 236, interface functionality 233, and fiber optic transceiver 232 within remote node 230 otherwise operate as described with respect to ROM 136, interface functionality 133, and fiber optic transceiver 132 in FIG. 1. The approach shown in FIG. 2 is also suitable for use in "retro-fitting" or "aftermarket" applications where a service provider desires to add optical path protection for deployed remote nodes that are not designed to house an optical combiner or an optical splitter. In such an application, the functionality of the ROM is implemented in an element management system that is otherwise coupled to the remote nodes, and the protection switching performed by the optical switch in the respective hub is controlled by communications from the element management system that is otherwise communicatively coupled to the hub.

Figure 3A:
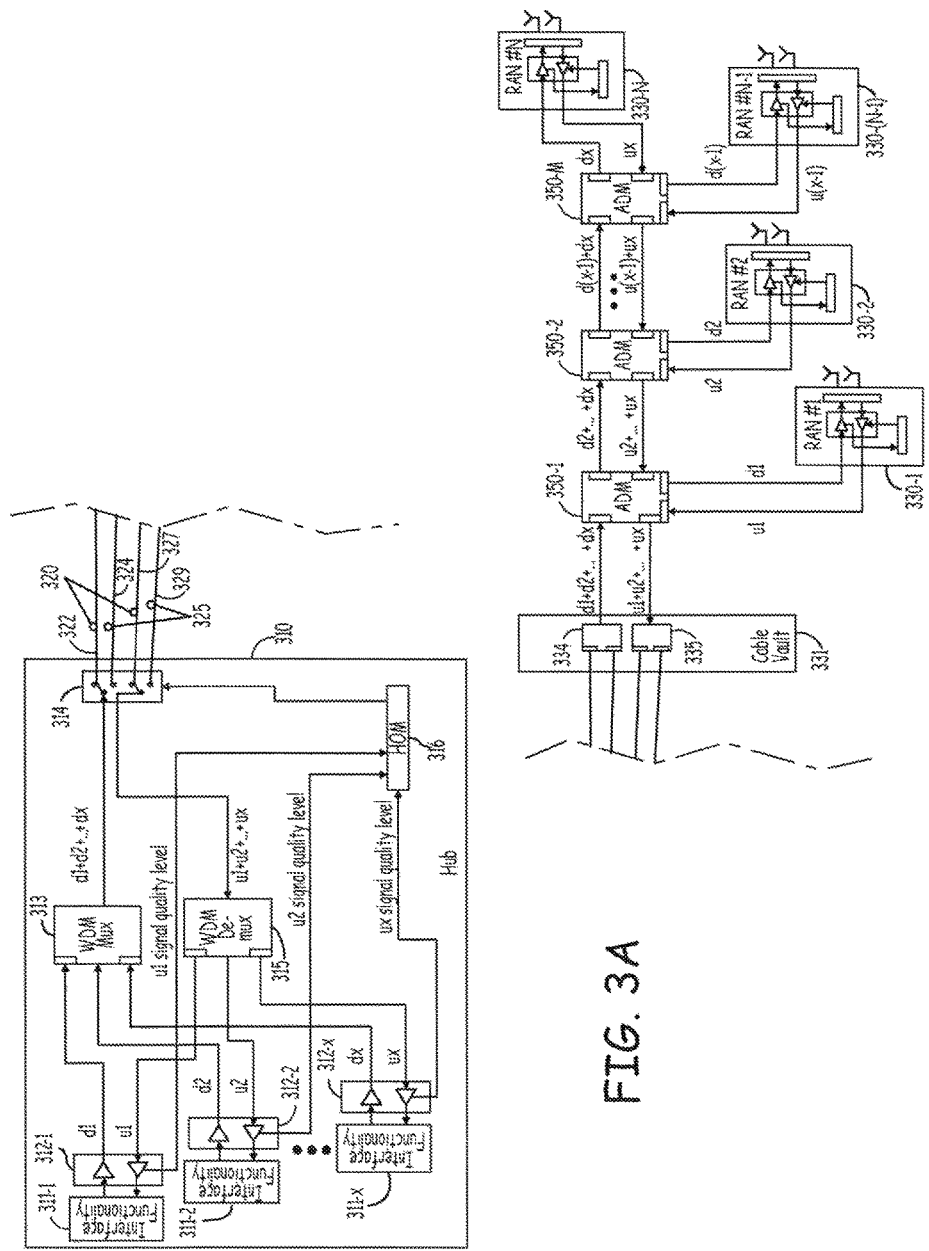
FIG. 3A is a block diagram of one embodiment of a distributed antenna system.

Although the embodiment shown in FIG. 1 is described, for the purposes of illustration, as using a single optical wavelength on each fiber, it is to be understood that in other embodiments multiple optical wavelengths can be used. One such embodiment is illustrated in FIG. 3A. In the embodiment of FIG. 3A, hub 310 communicates with a plurality of remote nodes 330-1 to 330-N via multiple wavelength optical signals. Hub 310 includes the functionality required to multiplex multiple optical carrier signals from a communications network (not shown) onto a single optical fiber by using different wavelengths of light to carry a plurality of different RF signals. Hub 310 comprises interface functionality 311-1 to 311-x that couple the hub 310 to one or more base stations (not shown). The hub 310 further comprises fiber optic transceivers 312-1 to 312-x communicatively coupled, respectively, to the interface functionality 311-1 to 311-x, and wave division multiplexing (WDM) multiplexer (MUX) 313 communicatively coupled to the downlink output of fiber optical transceivers 312-1 to 312-x. The hub 310 further comprises a WDM DE-MUX 315 communicatively coupled to the uplink inputs of optical transceivers 312-1 to 312-x and an optical switch 314 communicatively coupled to WDM MUX 313, WDM DE-MUX 315, primary optical fiber path 320 and backup optical fiber path 325. The hub 310 further comprises a hub optical path protection manager (HOM) 316 communicatively coupled to fiber optic transceivers 312-1 to 312-x and optical switch 314.

In the downlink direction, the interface functionality 311-1 to 311-x receives analog downlink RF signals from the one or more base stations to which the hub 310 is communicatively coupled and provides to the fiber optical transceivers 312-1 to 312-x, respectively, a suitable electrical signal for modulating onto a downlink optical carrier. The fiber optical transceivers 312-1 to 312-x modulate the electrical signal onto a different downlink optical carrier. The downlink optical signal d1, d2, to dx output by each of the fiber optic transceivers 312-1 to 312-x is optically multiplexed by WDM MUX 313 into a single downlink multiple wavelength optical signal (shown as d1+d2+ . . . +dx). The downlink multiple wavelength optical signal output by WDM MUX 313 is selectively communicated to the remote node 330 on either the primary downlink optical fiber 322 or secondary downlink optical fiber 327 by the optical switch 314, depending on a fiber path control signal output by the hub optical path protection manager 316.

In one digital-transport implementation of such an embodiment, the interface functionality 311-1 to 311-*x* receives one or more analog downlink radio frequency (RF) signals from each of the base stations to which the hub 310 is communicatively coupled and digitizes at least a portion of the received analog downlink RF signals (for example, by digitizing a particular frequency band of each received analog downlink RF signal). Also, in such a digital-transport implementation, each item of interface functionality 311-1 to 311-*x* combines at least a portion of the digitized downlink RF signals from one or more base stations into frames suitable for transmission on the primary downlink optical fiber 322 or the secondary downlink optical fiber 327 (for example, by formatting the at least a portion of the digitized downlink RF signals into SONET STS-48/OC-48 formatted frames). In such a digital-transport implementation, the fiber optic transceivers 312-1 to 312-*x* each digitally modulate the electrical signal (which comprises frames of digitized downlink RF signals) onto a respective downlink optical carrier. All of the downlink optical signals output by the fiber optic transceivers 312-1 to 312-*x* are multiplexed together by the WDM MUX 313. An example of downlink functionality suitable for use in such a digital-transport implementation is described in U.S. Pat. No. 6,963,552, titled "MULTI-PROTOCOL DISTRIBUTED WIRELESS SYSTEM ARCHITECTURE" (also referred to here as the "'552 Patent"), which is hereby incorporated herein by reference.

In an alternative analog-transport implementation of such an embodiment, the interface functionality 311-1 to 311-*x* each receives one or more analog downlink RF signals from each of the base stations to which the hub 310 is communicatively coupled and filters, combines, mixes, and/or splits the received analog downlink RF signals into a single electrical analog signal suitable for transmission on the primary downlink optical fiber 322 and/or the secondary downlink optical fiber 327. In such an analog-transport implementation, the fiber optic transceivers 312-1 to 312-*x* each amplitude modulate the single electrical analog signal received from the respective items of interface functionality 311-1 to 311-*x* onto a respective downlink optical carrier in order to generate the respective downlink optical signal. All of the downlink optical signals output by the fiber optic transceivers 312-1 to 312-*x* are multiplexed together by the WDM MUX 313. In the embodiment shown in FIG. 3A, the downlink output of hub 310 is coupled to the remote nodes 330-1 to 330-N via a cable vault 331 that is remotely located from the hub 310 and proximal to the first remote node 330-1. The cable vault 331 comprises an optical combiner 334 that has two inputs that are coupled to the primary downlink optical fiber 322 and the secondary downlink optical fiber 327. Optical switch 314 outputs the downlink multiple wavelength optical signal on either the primary downlink optical fiber 322 or the secondary downlink optical fiber 327, depending on the fiber path control signal from the hub optical path protection manager 316.

In the uplink direction, hub 310 receives an uplink multiple wavelength optical signal via one or both of primary uplink optical fiber 324 and secondary uplink optical fiber 329 from an optical splitter 335 that is also housed within the cable vault 331. The uplink multiple wavelength optical signal comprises multiplexed uplink optical signals (shown as u1, u2, ux) from the remote nodes 330-1 to 330-N. Optical switch 314 selectively couples one of the primary uplink optical fiber 324 and the secondary uplink optical fiber 329 to the WDM DE-MUX 315, depending on the fiber path control signal from the hub optical path protection manager 316. That is, when optical switch 314 selectively couples the primary uplink optical fiber 324 to the WDM DE-MUX 315, any uplink multiple wavelength optical signal received on the primary uplink optical fiber 324 is communicated to the WDM DE-MUX 315 by the optical switch 314. Likewise, when optical switch 314 selectively couples the secondary uplink optical fiber 329 to the WDM DE-MUX 315, any uplink multiple wavelength optical signal received on the secondary uplink optical fiber 329 is communicated to the WDM DE-MUX 315 by the optical switch 314. WDM DE-MUX 315 de-multiplexes the uplink multiple wavelength optical signal into x single wavelength optical signals, and forwards each single wavelength optical signal to one of the fiber optic transceivers 312-1 to 312-*x*. Each of the fiber optic transceivers 312-1 to 312-*x* demodulates the uplink optical signal they receive from WDM DE-MUX 315 in order to extract an electrical uplink RF signal, which is respectively provided to one or more base stations via the interface functionality 311-1 to 311-*x*. In the digital-transport implementation of such an embodiment noted above, the extracted uplink RF signal comprises frames (for example, SONET STS-48/OC-48 formatted frames) containing digitized uplink RF data, which the interface functionality 311-1 to 311-*x* extracts from the frames and converts to analog uplink RF signals. The analog uplink RF signals, in such an implementation, are provided to one or more base stations coupled to the hub 310. In the analog-transport implementation of such an embodiment noted above, the extracted uplink RF signal comprises analog uplink RF signals that are provided to one or more base stations coupled to the hub 310 (for example, with appropriate amplification and filtering). In the embodiment shown in FIG. 3A, optical combiner 334 operates as described above with respect to optical combiners 134 and 235 to combine any downlink multiple wavelength optical signal received on primary downlink optical fiber 322 and secondary downlink optical fiber 327 into a single downlink multiple wavelength optical output. Optical splitter 335 operates as described above with respect to optical splitters 135 and 235 to replicate any uplink multiple wavelength optical signal for communication to hub 310 via both of the primary uplink optical fiber 324 and the secondary uplink optical fiber 329.

In the embodiment shown in FIG. 3A, remote nodes 330-1 to 330-N are communicatively coupled to one another in a "daisy chain" topology. Each of the remote nodes 330-1 to 330-N is coupled to optical combiner 334 and optical splitter 335 through add/drop multiplexers 350-1 to 350-M.

In the downlink direction, a first add/drop multiplexer 350-1 is coupled to optical combiner 334 and receives the downlink multiple wavelength signal that comprises a multiplexed version of the RF data signal outputs from fiber optic transceivers 312-1 to 312-*x* (shown as d1+d2+ . . . +dx). Add/drop multiplexer 350-1 "drops" downlink optical signal d1 (which is the downlink optical signal output by the fiber optic transceiver 330-1) to first remote node 330-1 over a downlink optical fiber. In the implementation shown in FIG. 3A, Add/drop multiplexer 350-1 also outputs the received downlink multiple wavelength signal minus the downlink optical signal d1 dropped to the first remote node 330-1 (shown as d2+ . . . +dx) to the next add/drop multiplexer in the daisy chain. The next add/drop multiplexer in the downlink direction receives the signal from the first add/drop multiplexer, similarly drops the second downlink optical signal d2 to the second remote node 330-2, and outputs the remaining signal to next add/drop multiplexer in the daisy chain. Each of the add/drop multiplexers in the daisy chain similarly drop the respective downlink optical signal to the respective remote unit until the last remote node 330-N receives the last downlink optical signal (shown as dx). In alternate implementations, the downlink optical signals are not necessarily removed from the fiber as they are dropped to their associated remote nodes. For example, in one such alternate implementation, Add/drop multiplexer 350-1 outputs the same downlink multiple wavelength signal it received to the next add/drop multiplexer in the daisy chain.

In the uplink direction each of the add/drop multiplexers 350-1 to 350-M adds a respective uplink optical signal received from a respective remote node to the previously multiplexed optical signals from the daisy chain. For example, add/drop multiplexer 350-M multiplexes together uplink optical signals received from the last remote node 330-N and the second to last remote node 330-(N−1) to produce an uplink multiple wavelength optical signal (illustrated in FIG. 3A as u(x−1)+ux). The next upstream add/drop multiplexer receives that uplink multiple wavelength optical signal u(x−1)+ux and adds it together with an uplink optical signal received from its associated remote node. Thus the uplink multiple wavelength optical signal received by optical splitter 335 comprises a multiplexed version of the uplink multiple wavelength optical signal (shown as u1+u2+ . . . +ux).

Each of the remote nodes 330-1 to 330-N comprise a fiber optic transceiver, interface functionality, and a remote optical path protection (OPP) manager that function as described with respect to remote node 230 illustrated in FIG. 2. For example, remote node 330-1, evaluates the downlink signal quality of the downlink optical signal received from the hub 310. In one implementation, the remote nodes 330-1-330-N determines the bit error rate (BER) of the respective downlink optical signal received at that remote node. When the BER measured by from one or more of the remote nodes 330-1-330-N drops below a predetermined threshold level, that remote node reports the BER to hub 310 by any of the means described with respect to FIGS. 1 and 2. Hub 310 can then make the determination on whether to realign optical switch 314 from the primary fiber path 320 to the backup fiber path 325. In other implementations, other signal quality indicators are used to determine whether or not communications via primary fiber path 320 are within acceptable operating parameters. For example, in another implementation each of the remote nodes 330-1-330-N determine the optical power level of the downlink optical signal it receives. In such an implementation, when the optical power level drops below a predetermined threshold power level, the remote nodes reports the optical power level to hub 310 by any of the means described with respect to FIGS. 1 and 2. Hub 310 can then make the determination on whether to realign optical switch 314 from the primary fiber path 320 to the backup fiber path 325.

In one implementation, hub 310 determines whether to switch from primary fiber path 320 to the backup fiber path 325 based on all of the signal quality feedback provided for the remote nodes 330-1 to 330-N. For example, in one implementation, if a downlink BER or optical power level reported by any one of the remote nodes 330-1 to 330-N indicates degrading optical signal quality, but downlink BERs or optical power levels reported by the other remote nodes do not, the hub 310 concludes that the degrading optical signal quality is due to a local problem with the one remote node, rather than a degradation of the primary fiber path 320. However, when all of the remote nodes 330-1 to 330-N report degrading downlink optical signal quality, then hub 310 concludes that the degrading optical signal quality is due to a degradation of the primary fiber path 320 and switches to the backup fiber path 325. Similarly, if hub 310 detects the loss of an uplink optical signal from one of the remote nodes 330-1 to 330-N, but continues to detect uplink optical signals from the other remote nodes, the hub 310 concludes that the degrading optical signal quality is due to a local problem with that remote node, rather than a degradation of the primary fiber path 320. However, when hub 310 detects a loss of uplink optical signals from all of the remote nodes 330-1 to 330-N, then hub 310 concludes that the degrading optical signal quality is due to a degradation of the primary fiber path 320 and switches to the backup fiber path 325.

Although the embodiments illustrated in this specification describe optical path protection systems and methods in terms of switching from a designated primary fiber path to a designated backup fiber path upon detection of primary fiber path degradation, one of ordinary skill in the art upon reading this specification would appreciate that the same systems and methods are applicable for switching from the designated backup fiber path back to the designated primary fiber path. Further, the designation in the field of which fiber path is the primary fiber path and which is the backup fiber path is arbitrarily determined by the system operator. As such embodiments of the present invention include embodiments for switching between any first fiber path and any second fiber path. In some embodiments, hysteresis is including in the switching determination made by a hub to prevent continual switching (also called 'Flapping') between two fiber paths that are both degraded but not failed.

Figure 3B:
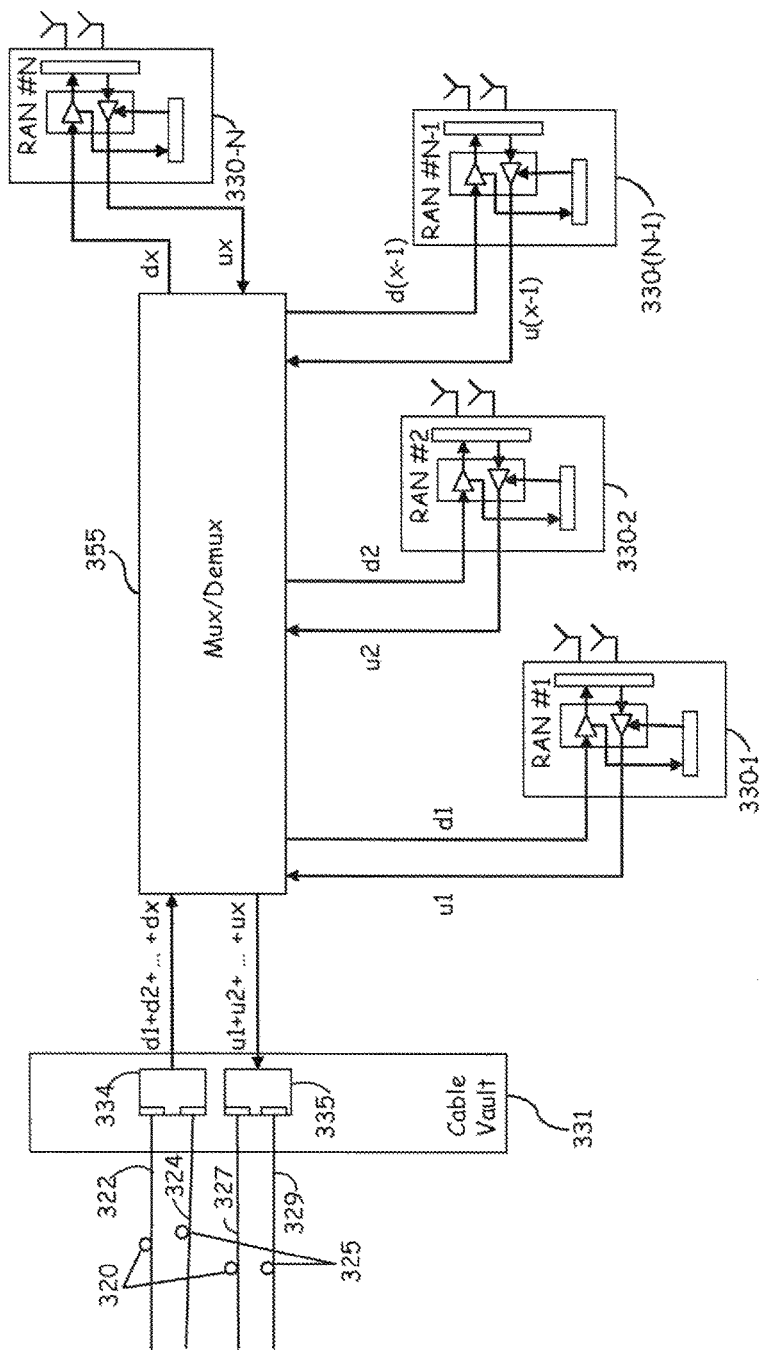
FIG. 3B is a block diagram of one embodiment of a distributed antenna system.

FIG. 3A illustrates and embodiment where each of the remote units 330-1 to 330-N is associated with its own add/drop multiplexer. FIG. 3B illustrates one embodiment where a single mux/demux 355 is located at a convenient installation near remote units 330-1 to 330-N. Instead of daisy chaining the multiple add/drop multiplexers 350-1 to 350-M, to communicate the uplink optical signals (u1 to ux) and downlink optical signals (d1 to dx) with remote units 330-1 to 330-N, in the embodiment of FIG. 3B, mux/demux 355 is directly coupled to each of remote units 330-1 to 330-N, optical combiner 334 and optical splitter 335. Mux/demux 355 includes the functionality required to receive the downlink multiple wavelength signal (shown as d1+d2+ . . . +dx)from optical combiner 334 and distribute each of the downlink optical signals (d1 to dx) within the downlink multiple wavelength signal to their corresponding remote unit of remote units 330-1 to 330-N. Mux/demux 355 includes the functionality required to receive the uplink optical signals (u1 to ux) from remote units 330-1 to 330-N, multiplex the uplink optical signals to into the uplink multiple wavelength signal (shown as u1+u2+ . . . +ux), and communicate the uplink multiple wavelength signal to optical splitter 335.

Figure 4:
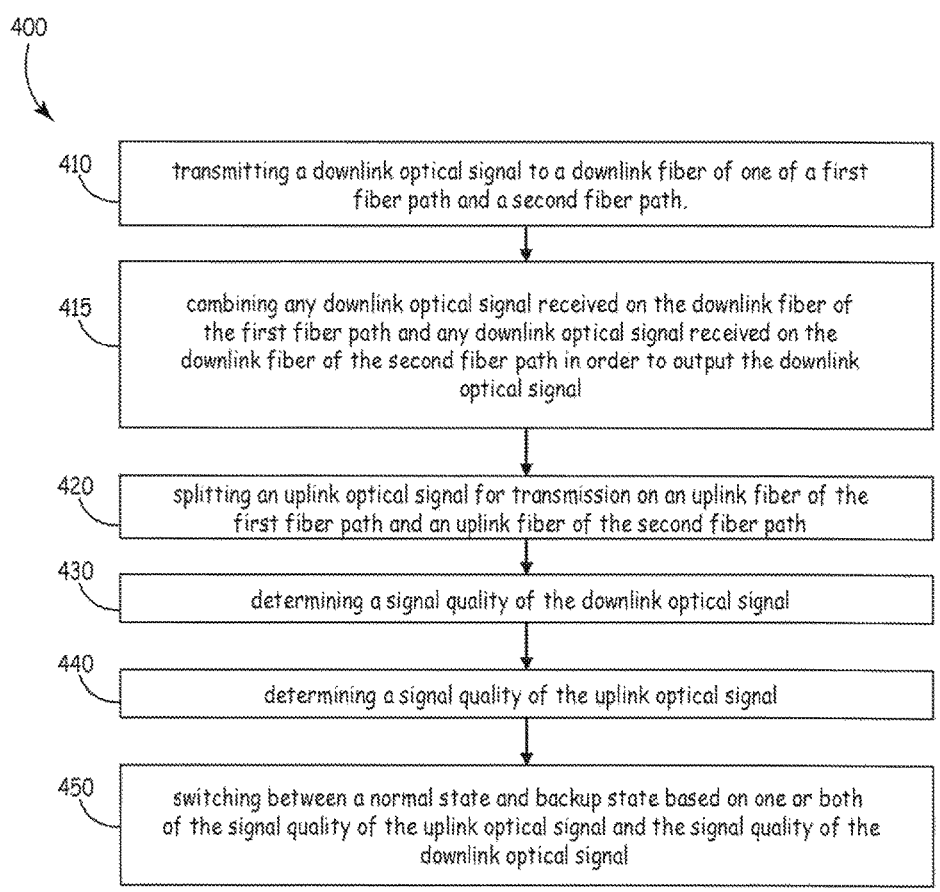
FIG. 4 is a flow chart of a one embodiment of a method of providing passive optical path protection.

FIG. 4 is a flow chart illustrating a method for providing optical path protection for a distributed antenna system. In one implementation, the method is performed by a distributed antenna system as described with respect to FIGS. 1, 2 and 3. The method begins at 410 with transmitting a downlink optical signal to a downlink fiber of one of a first fiber path and a second fiber path. In one implementation, the first fiber path functions as a primary fiber path while the second fiber path functions as a backup fiber path. In other implementations, the first fiber path functions as backup fiber path while the second fiber path functions as the primary fiber path. In one implementation, transmitting the downlink optical signal is performed from a hub of the distributed antenna system. The method continues at 415 with combining any downlink optical signal received on the downlink fiber of the first fiber path and any downlink optical signal received on the downlink fiber of the second fiber path in order to output the downlink optical signal. Combining any downlink optical signals from the first and second fiber paths at 415 while transmitting a downlink optical signal at 410 to only one of those paths enables the passive reception of the downlink optical signal without a-priori knowledge of whether the downlink optical signal is transmitted on the first or second fiber path. The method continues at 420 with splitting an uplink optical signal for transmission on an uplink fiber of the first fiber path and an uplink fiber of the second fiber path. Splitting the uplink optical signal for transmission on both the first and second optical fiber paths enables the passive transmission of the uplink optical signal from a remote node without the need for a-priori knowledge of whether a hub is aligned to receive uplink optical signals from the first or second optical fiber path. In one implementation, transmitting the uplink optical signal is performed from a remote node of the distributed antenna system. The method proceeds to 430 with determining a signal quality of the downlink optical signal. In one implementation of the method, determining the signal quality of the downlink optical signal comprises calculating the bit error rate of the downlink optical signal. In one implementation of the method, determining the signal quality of the downlink optical signal comprises determining the optical power level of the downlink optical signal. In one implementation, when the downlink optical signal comprises multiple wavelengths, determining the signal quality of the downlink optical signal comprises determining the bit error rate for data communicated in one of the multiple wavelengths. In one implementation, a remote node communicates the signal quality of the downlink optical signal back to the hub. Communication of the signal quality to the hub can include transmitting signal quality data to the hub via an uplink optical signal, or alerting the hub of inadequate downlink optical signal quality by disabling the uplink optical signal. The method proceeds to 440 with determining a signal quality of the uplink optical signal. In one implementation of the method, determining the signal quality of the uplink optical signal comprises calculating the bit error rate of the uplink optical signal. In one implementation, when the uplink optical signal comprises multiple wavelengths, determining the signal quality of the downlink optical signal comprises determining the bit error rate for data communicated in one of the multiple wavelengths. The method proceeds to 450 with switching between a normal state and backup state based on one or both of the signal quality of the uplink optical signal and the signal quality of the downlink optical signal. In one implementation of the method when switched to a normal state, downlink optical signals are transmitted on the downlink fiber of the first fiber path and uplink optical signals are received on the uplink fiber of the first fiber path. In such an implementation, when switched to the backup state, downlink optical signals are transmitted on the downlink fiber of the second fiber path and uplink optical signals are received on the uplink fiber of the second fiber path. In another implementation of the method, when switched to the normal state, downlink optical signals are transmitted on the downlink fiber of the second fiber path and uplink optical signals are received on the uplink fiber of the second fiber path. In such an implementation, when switched to the backup state, downlink optical signals are transmitted on the downlink fiber of the first fiber path and uplink optical signals are received on the uplink fiber of the first fiber path.

In one implementation, when a hub is switched to utilize the first fiber path and either the signal quality of the downlink optical signal (determined at 430) or the signal quality of the uplink optical signal (determined at 440) is inadequate, the hub switches from the first fiber path to the second fiber path. Conversely, when the hub is switched to utilize the second fiber path and either the signal quality of the downlink optical signal (determined at 430) or the signal quality of the uplink optical signal (determined at 440) is inadequate, the hub switches from the second fiber path to the first fiber path. In one implementation of the method, hysteresis is including in the switching determination made by a hub to prevent continual switching between the first and second fiber paths when both are degraded but not failed.

Figure 5:
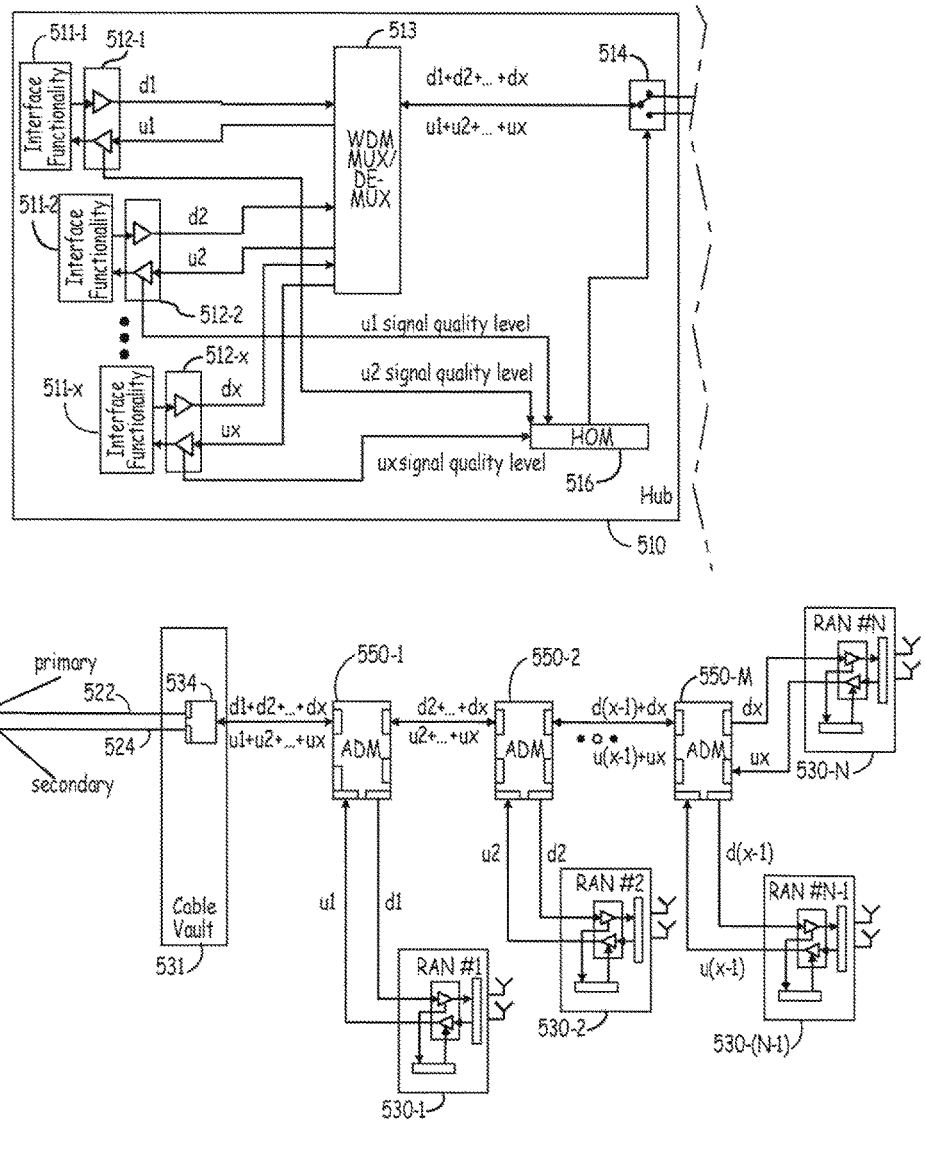
FIG. 5 is a block diagram of one embodiment of a distributed antenna system.

As would be appreciated by one skilled in the art upon reading this specification, a single fiber can be used to communicate both an uplink optical signal and a downlink optical signal simultaneously by appropriate allocation of wavelengths. Such implementations are included within the scope of embodiments of the present invention, as illustrated by the embodiment of FIG. 5. In the embodiment of FIG. 5, hub 510 communicates with a plurality of remote nodes 530-1 to 530-N via multiple wavelength optical signals. Hub 510 includes the functionality required to multiplex multiple optical carrier signals from a communications network (not shown) onto a single optical fiber by using different wavelengths of light to carry a plurality of different RF signals. Hub 510 comprises interface functionality 511-1 to **511-*x* that couple the hub 310 to one or more base stations (not shown). The hub 510 further comprises fiber optic transceivers 512-1 to 512-*x* communicatively coupled, respectively, to the interface functionality 511-1 to 511-*x*. The hub 510 further comprises a hub optical path protection manager (HOM) 516 communicatively coupled to fiber optic transceivers 512-1 to 512-*x* and optical switch 514**.

Hub 510 further comprises a wave division multiplexing (WDM) multiplexer/demultiplexer (MUX/DE-MUX) 513 that is communicatively coupled to the downlink output of fiber optical transceivers 312-1 to **312-*x* and the uplink inputs of optical transceivers 312-1 to 312-*x*, and further comprises an optical switch 514 communicatively coupled to WDM MUX/DE-MUX 513, primary optical fiber path 520 and backup optical fiber path 525. In the embodiment of FIG. 5, primary optical fiber path 520 comprises a common fiber used to communicate both an uplink multiple wavelength signal (shown as u1+u2+ . . . +ux) from hub 510 to remote nodes 530-1 to 530-N and a downlink multiple wavelength signal (shown as d1+d2+ . . . +dx) from the remote nodes 530-1 to 530-N to hub 510. Backup optical fiber path 525 comprises another common fiber used to communicate both an uplink multiple wavelength signal from hub 510 to remote nodes 530-1 to 530-N and a downlink multiple wavelength signal from the remote nodes 530-1 to 530-N to hub 510**.

In the downlink direction, the interface functionality 511-1 to **511-*x* receives analog downlink RF signals from the one or more base stations to which the hub 510 is communicatively coupled and provides to the fiber optical transceivers 512-1 to 512-*x*, respectively, a suitable electrical signal for modulating onto a downlink optical carrier. The fiber optical transceivers 512-1 to 512-*x* modulate the electrical signal onto a different downlink optical carrier. The downlink optical signal (d1, d2, to dx) output by each of the fiber optic transceivers 512-1 to 512-*x* is optically multiplexed by WDM MUX/DE-MUX 513 into the single downlink multiple wavelength optical signal (shown as d1+d2+ . . . +dx). The downlink multiple wavelength optical signal output by WDM MUX/DE-MUX 513 is selectively communicated to the remote node 330 on either the primary optical fiber path 520 or the backup optical fiber path 525 by the optical switch 514, depending on a fiber path control signal output by the hub optical path protection manager 516**.

In one digital-transport implementation of such an embodiment, the interface functionality 511-1 to 511-$x$ receives one or more analog downlink radio frequency (RF) signals from each of the base stations to which the hub 510 is communicatively coupled and digitizes at least a portion of the received analog downlink RF signals (for example, by digitizing a particular frequency band of each received analog downlink RF signal). Also, in such a digital-transport implementation, each item of interface functionality 511-1 to 511-$x$ combines at least a portion of the digitized downlink RF signals from one or more base stations into frames suitable for transmission on the primary optical fiber path 520 or the backup optical fiber path 525 (for example, by formatting the at least a portion of the digitized downlink RF signals into SONET STS-48/OC-48 formatted frames). In such a digital-transport implementation, the fiber optic transceivers 512-1 to 512-$x$ each digitally modulate the electrical signal (which comprises frames of digitized downlink RF signals) onto a respective downlink optical carrier. All of the downlink optical signals output by the fiber optic transceivers 512-1 to 512-$x$ are multiplexed together by the WDM MUX/DE-MUX 513. An example of downlink functionality suitable for use in such a digital-transport implementation is described in U.S. Pat. No. 6,963,552, titled "MULTI-PROTOCOL DISTRIBUTED WIRELESS SYSTEM ARCHITECTURE" (also referred to here as the "'552 Patent"), which is hereby incorporated herein by reference.

In an alternative analog-transport implementation of such an embodiment, the interface functionality 511-1 to 511-$x$ each receives one or more analog downlink RF signals from each of the base stations to which the hub 510 is communicatively coupled and filters, combines, mixes, and/or splits the received analog downlink RF signals into a single electrical analog signal suitable for transmission on the primary optical fiber path 520 or the backup optical fiber path 525. In such an analog-transport implementation, the fiber optic transceivers 512-1 to 512-$x$ each amplitude modulate the single electrical analog signal received from the respective items of interface functionality 511-1 to 511-$x$ onto a respective downlink optical carrier in order to generate the respective downlink optical signal. All of the downlink optical signals output by the fiber optic transceivers 512-1 to 512-$x$ are multiplexed together by the WDM MUX/DE-MUX 513. In the embodiment shown in FIG. 5, the downlink output of hub 510 is coupled to the remote nodes 530-1 to 530-N via a cable vault 531 that is remotely located from the hub 510 and proximal to the first remote node 530-1. The cable vault 531 comprises an optical combiner/splitter 534 that has two inputs that are coupled to the primary optical fiber path 520 and the backup optical fiber path 525. Optical switch 514 outputs the downlink multiple wavelength optical signal on either the primary optical fiber path 520 or the backup optical fiber path 525, depending on the fiber path control signal from the hub optical path protection manager 516.

In the uplink direction, hub 510 receives an uplink multiple wavelength optical signal via one or both of primary optical fiber path 520 and the backup optical fiber path 525 from optical combiner/splitter 534. The uplink multiple wavelength optical signal comprises multiplexed uplink optical signals (shown as u1, u2, ux) from the remote nodes 530-1 to 530-N. Optical switch 514 selectively couples one of the primary optical fiber path 520 or the backup optical fiber path 525 to the WDM MUX/DE-MUX 513, depending on the fiber path control signal from the hub optical path protection manager 516. That is, when optical switch 514 selectively couples the primary optical fiber path 520 to the WDM MUX/DE-MUX 513, any uplink multiple wavelength optical signal received on the primary optical path 520 is communicated to the WDM MUX/DE-MUX 513 by the optical switch 514. Likewise, when optical switch 514 selectively couples the backup optical path 525 to the WDM MUX/DE-MUX 513, any uplink multiple wavelength optical signal received on the backup optical path 525 is communicated to the WDM MUX/DE-MUX 513 by the optical switch 514.

WDM MUX/DE-MUX 513 de-multiplexes the uplink multiple wavelength optical signal into x single wavelength optical signals, and forwards each single wavelength optical signal to one of the fiber optic transceivers 512-1 to 512-$x$. Each of the fiber optic transceivers 512-1 to 512-$x$ demodulates the uplink optical signal they receive from WDM MUX/DE-MUX 315 in order to extract an electrical uplink RF signal, which is respectively provided to one or more base stations via the interface functionality 511-1 to 511-$x$. In the digital-transport implementation of such an embodiment noted above, the extracted uplink RF signal comprises frames (for example, SONET STS-48/OC-48 formatted frames) containing digitized uplink RF data, which the interface functionality 511-1 to 511-$x$ extracts from the frames and converts to analog uplink RF signals. The analog uplink RF signals, in such an implementation, are provided to one or more base stations coupled to the hub 510. In the analog-transport implementation of such an embodiment noted above, the extracted uplink RF signal comprises analog uplink RF signals that are provided to one or more base stations coupled to the hub 510 (for example, with appropriate amplification and filtering). In the embodiment shown in FIG. 5, optical combiner/splitter 534 operates in the downlink direction as described above with respect to optical combiners 134 and 235 to combine any downlink multiple wavelength optical signal received on primary optical path 520 and backup optical path 525 into a single downlink multiple wavelength optical output. Optical combiner/splitter 535 operates in the uplink direction as described above with respect to optical splitters 135 and 235 to replicate any uplink multiple wavelength optical signal for communication to hub 510 via both of the primary optical path 520 and the backup optical path 525.

In the embodiment shown in FIG. 5, remote nodes 530-1 to 530-N are communicatively coupled to one another in a "daisy chain" topology. Each of the remote nodes 530-1 to 530-N is coupled to optical combiner/splitter 534 through add/drop multiplexers 550-1 to 550-M. In the embodiment shown in FIG. 5, each of the add/drop multiplexers 550-1 to 550-M are coupled to their adjacent add/drop multiplexer using a common used to communicate both the uplink optical signals and downlink optical signals simultaneously by appropriate allocation of wavelengths. The first add/drop multiplexer 550-1 is coupled to optical combiner/splitter 534 via a common fiber used to receive the downlink multiple wavelength signal from the optical combiner/splitter 534 and to send the uplink downlink multiple wavelength signal to the optical combiner/splitter 534.

Add/drop multiplexers 550-1 to 550-M each include the functionality described with respect to add/drop multiplexers 350-1 to 350-M. In the downlink direction first add/drop multiplexer 550-1 receives the downlink multiple wavelength signal (shown as d1+d2+ . . . +dx), and "drops" downlink optical signal d1 to first remote node 530-1 over an optical fiber. In the implementation shown in FIG. 5, add/drop multiplexer 550-1 also outputs the received downlink multiple wavelength signal minus the downlink optical signal d1 dropped to the first remote node 530-1 (shown as d2+ . . . +dx) to the next add/drop multiplexer in the daisy chain. The next add/drop multiplexer in the downlink direction receives the signal from the first add/drop multiplexer, similarly drops the second downlink optical signal d2 to the second remote node 530-2, and outputs the remaining signal to next add/drop multiplexer in the daisy chain. Each of the add/drop multiplexers in the daisy chain similarly drop the respective downlink optical signal to the respective remote unit until the last remote node 530-N receives the last downlink optical signal (shown as dx). In alternate implementations, the downlink optical signals are not necessarily removed from the fiber as they are dropped to their associated remote nodes. For example, in one such alternate implementation, Add/drop multiplexer 550-1 outputs the same downlink multiple wavelength signal it received to the next add/drop multiplexer in the daisy chain.

In the uplink direction each of the add/drop multiplexers 550-1 to 550-M adds a respective uplink optical signal received from a respective remote node to the previously multiplexed optical signals from the daisy chain. In one implementation an add/drop multiplexer receives an uplink optical signal from their associated remote node over the same optical fiber used to send the downlink optical signal to the remote node. For example, add/drop multiplexer 550-M multiplexes together uplink optical signals received from the last remote node 530-N and the second to last remote node 530-(N−1) to produce an uplink multiple wavelength optical signal (illustrated in FIG. 5 as u(x−1)+ux). The next upstream add/drop multiplexer receives that uplink multiple wavelength optical signal u(x−1)+ux and adds it together with an uplink optical signal received from its associated remote node. Thus the uplink multiple wavelength optical signal received by optical splitter 535 comprises a multiplexed version of the uplink multiple wavelength optical signal (shown as u1+u2+ . . . +ux).

Each of the remote nodes 530-1 to 530-N comprise a fiber optic transceiver, interface functionality, and a remote optical path protection (OPP) manager that function as described with respect to remote node 230 illustrated in FIG. 2. For example, remote node 530-1, evaluates the downlink signal quality of the downlink optical signal received from the hub 510. In one implementation, the remote nodes 530-1-530-N determines the bit error rate (BER) of the respective downlink optical signal received at that remote node. When the BER measured by from one or more of the remote nodes 530-1-530-N drops below a predetermined threshold level, that remote node reports the BER to hub 510 by any of the means described with respect to FIGS. 1 and 2. Hub 510 can then make the determination on whether to realign optical switch 514 from the primary fiber path 520 to the backup fiber path 525. In other implementations, other signal quality indicators are used to determine whether or not communications via primary fiber path 520 are within acceptable operating parameters. For example, in another implementation each of the remote nodes 530-1-530-N determine the optical power level of the downlink optical signal it receives. In such an implementation, when the optical power level drops below a predetermined threshold power level, the remote nodes reports the optical power level to hub 510 by any of the means described with respect to FIGS. 1 and 2. Hub 510 can then make the determination on whether to realign optical switch 514 from the primary fiber path 520 to the backup fiber path 525.

In one implementation, hub 510 determines whether to switch from primary fiber path 520 to the backup fiber path 525 based on all of the signal quality feedback provided for the remote nodes 530-1 to 530-N. For example, in one implementation, if a downlink BER or optical power level reported by any one of the remote nodes 530-1 to 530-N indicates degrading optical signal quality, but downlink BERs or optical power levels reported by the other remote nodes do not, the hub 510 concludes that the degrading optical signal quality is due to a local problem with the one remote node, rather than a degradation of the primary fiber path 520. However, when all of the remote nodes 530-1 to 530-N report degrading downlink optical signal quality, then hub 510 concludes that the degrading optical signal quality is due to a degradation of the primary fiber path 520 and switches to the backup fiber path 525. Similarly, if hub 510 detects the loss of an uplink optical signal from one of the remote nodes 530-1 to 530-N, but continues to detect uplink optical signals from the other remote nodes, the hub 510 concludes that the degrading optical signal quality is due to a local problem with that remote node, rather than a degradation of the primary fiber path 520. However, when hub 510 detects a loss of uplink optical signals from all of the remote nodes 530-1 to 530-N, then hub 510 concludes that the degrading optical signal quality is due to a degradation of the primary fiber path 520 and switches to the backup fiber path 525.

It would be appreciated by one skilled in the art upon reading this specification that the embodiments of the present invention are not limited to the transport of analog RF signals but includes the transport of analog RF signals and digital RF signals, or any combination thereof in either the uplink or downlink directions. For example, in one implementation of a network such as those describe above, one or more of a hub's interface functionality communicate wirelessly to one or more base stations via digital RF signals while one or more of the remote nodes communicate wirelessly via analog RF signals. Such an implementation may include, but is not limited to a Universal Mobile Telecommunications System/Wideband Code Division Multiple Access (UMTS/WCDMA) network.

EXAMPLE EMBODIMENTS

Example 1 includes a first node of a distributed antenna system configured to communicate with at least one second node of the distributed antenna system, the at least one second node being remote from the first node, the first node comprising: first and second optical-signal ports configured to receive first and second input optical signals via first and second fiber paths, respectively; an optical switch having first and second switch ports coupled to the first and second optical-signal ports, having a third switch port, and configured to couple, selectively, the first input optical signal or the second input optical signal to the third switch port in response to a quality of one of the first and second input optical signals; an optical transceiver configured to receive the coupled one of the first and second input optical signals from the third switch port and to convert the coupled one of the first and second input optical signals into a first electrical signal; and an interface circuit configured to convert the first electrical signal into an output RF signal.

Example 2 includes the first node of any of Examples 1-2 wherein the interface circuit is configured to couple the output RF signal to an antenna.

Example 3 includes the first node of Example 2, wherein: the interface circuit is configured to receive an input RF signal from the antenna and to convert the input RF signal into a second electrical signal; the optical transceiver is configured to convert the second electrical signal into an output optical signal and to couple the output optical signal to the third switch port; and the optical switch is configured, selectively, to couple the output optical signal to one of the first and second optical ports in response to the quality of one of the first and second input optical signals.

Example 4 includes the first node of any of Examples 1-3, further comprising a quality circuit configured: to determine the quality of the one of the first and second input optical signals that the optical switch is coupling to the third switch node; and to toggle the optical switch to couple the other of the first and second input optical signals to the third switch node in response to the quality circuit determining that the quality of the one of the first and second input optical signals is below a quality threshold.

Example 5 includes the first node of any of Examples 1-4, further comprising: third and fourth optical-signal ports configured to provide first and second output optical signals to third and fourth fiber paths, respectively; wherein the optical switch circuit includes fourth and fifth switch ports respectively coupled to the third and fourth optical-signal ports, and includes a sixth switch port; wherein the interface circuit is configured to receive an input RF signal and to convert the input RF signal into a second electrical signal; the optical transceiver is configured to convert the second electrical signal into a third output optical signal and to couple the third output optical signal to the sixth switch port; and the optical switch is configured, selectively, to couple the third output optical signal to one of the third and fourth optical-signal ports in response to the quality of one of the first and second input optical signals.

Example 6 includes the first node of Example 5, further comprising a quality circuit configured: to determine the quality of the one of the first and second input optical signals that the optical switch is coupling to the third switch node; and to toggle the optical switch to couple the other of the first and second input optical signals to the third switch node, and to couple the third output optical signal to another one of the third and fourth optical-signal ports, in response to the quality circuit determining that the quality of the one of the first and second input optical signals is below a quality threshold.

Example 7 includes the first node of any of Examples 2-6, further comprising: third and fourth optical-signal ports configured to provide first and second output optical signals to the at least one second node of the distributed antenna system via third and fourth fiber paths, respectively; wherein the optical switch circuit includes fourth and fifth switch ports respectively coupled to the third and fourth optical-signal ports, and includes a sixth switch port; wherein the interface circuit is configured to receive an input RF signal from the antenna and to convert the input RF signal into a second electrical signal; the optical transceiver is configured to convert the second electrical signal into a third output optical signal and to couple the third output optical signal to the sixth switch port; and the optical switch is configured, selectively, to couple the third output optical signal to one of the third and fourth optical-signal ports in response to the quality of one of the first and second input optical signals.

Example 8 includes a first node of a distributed antenna system, the first node comprising: first and second optical-signal ports configured to receive first and second input optical signals from at least one second node of the distributed antenna system via first and second fiber paths, respectively, the at least one second node being remote from the first node; an optical switch having first and second switch ports coupled to the first and second optical-signal ports, having a third switch port, and configured to couple, selectively, the first input optical signal or the second input optical signal to the third switch port in response to a quality of one of the first and second input optical signals; an optical transceiver configured to receive the coupled one of the first and second input optical signals from the third switch port and to convert the coupled one of the first and second input optical signals into a first electrical signal; and an interface circuit configured to convert the first electrical signal into an output RF signal.

Example 9 includes a method, comprising: receiving, via first and second optical paths, first and second input optical signals at first and second optical-signal ports, respectively, of a first node of a distributed antenna system; coupling, selectively, the first input optical signal or the second input optical signal to an optical transceiver in response to the quality of one of the first and second input optical signals; converting, with the optical transceiver, the coupled one of the first and second input optical signals into a first electrical signal; and converting the first electrical signal into an output RF signal.

Example 10 includes the method of any of Examples 9-10 wherein receiving the first and second input optical signals includes receiving the first and second optical signals from at least one second node of the distributed antenna system, the at least one second node located remote from the first node.

Example 11 includes the method of Example 9, further comprising: coupling the output RF signal to an antenna; and radiating a transmission signal with the antenna in response to the output RF signal.

Example 12 includes the method of any of Examples 9-11, further comprising: receiving, at the first node, an input RF signal from an antenna; converting the input RF signal into a second electrical signal; converting, with the optical transceiver, the second electrical signal into an output optical signal; coupling, selectively, the output optical signal to one of the first and second optical ports in response to the quality of one of the first and second input optical signals.

Example 13 includes the method of any of Examples 9-12, further comprising: determining the quality of the one of the first and second input optical signals coupled to the optical transceiver; and coupling the other of the first and second input optical signals to the optical transceiver in response to determining that the quality of the one of the first and second input optical signals is below a quality threshold.

Example 14 includes the method of any of Examples 9-13, further comprising: receiving an input RF signal at the first node; converting the input RF signal into a second electrical signal; converting, with the optical transceiver, the second electrical signal into an output optical signal; and coupling, selectively and in response to the quality of one of the first and second input optical signals, the output optical signal to one of third and fourth fiber paths respectively coupled to third and fourth optical-signal ports of the first node.

Example 15 includes the method of Example 14, further comprising: determining the quality of the one of the first and second input optical signals coupled to the optical transceiver; and coupling the other of the first and second input optical signals to the optical transceiver, and coupling the output optical signal to another one of the third and fourth fiber paths, in response to determining that the quality of the one of the first and second input optical signals is below a quality threshold.

Example 16 includes the method of any of Examples 10-15, further comprising: receiving, from an antenna, an input RF signal at the first node; converting the input RF signal into a second electrical signal; converting, with the optical transceiver, the second electrical signal into an output optical signal; and coupling, selectively and in response to the quality of one of the first and second input optical signals, the output optical signal to the at least one second node via one of third and fourth fiber paths respectively coupled to third and fourth optical-signal ports of the first node.

Example 17 includes a distributed antenna system, comprising: at least one first node; a second node configured to communicate with, and being remote from, the at least one first node, the second node comprising first and second optical-signal ports configured to receive first and second input optical signals via first and second fiber paths, respectively, an optical switch having first and second switch ports coupled to the first and second optical-signal ports, having a third switch port, and configured to couple, selectively, the first input optical signal or the second input optical signal to the third switch port in response to a quality of one of the first and second input optical signals, an optical transceiver configured to receive the coupled one of the first and second input optical signals from the third switch port and to convert the coupled one of the first and second input optical signals into an electrical signal, and an interface circuit configured to convert the electrical signal into an output RF signal.

Example 18 includes the distributed antenna system of any of Examples 17-18 wherein: the at least one first node includes at least one remote node; and the second node includes a hub.

Example 19 includes a non-transitory computer-readable medium storing instructions that, when executed by at least one computing circuit, cause the at least one computing circuit, or at least one other circuit responsive to the at least one computing circuit: to receive, via first and second optical paths, first and second input optical signals at first and second optical-signal ports, respectively, of a first node of a distributed antenna system; to couple, selectively, the first input optical signal or the second input optical signal to an optical transceiver in response to the quality of one of the first and second input optical signals; to convert, with the optical transceiver, the coupled one of the first and second input optical signals into an electrical signal; and to convert the electrical signal into an output RF signal.

Example 20 includes a distributed antenna system comprising: a first node; a second node coupled to the first node via a first cable and a second cable; a third node coupled to the second node via a third cable and a fourth cable; wherein the first node is configured to transmit a first signal over the first cable; and wherein the second node is configured to couple the first signal from the first cable to the third cable such that the first signal from the first node can be sent over the first cable and third cable to the third node; wherein the third node is configured to transmit a second signal over the fourth cable, and wherein the second node is configured to couple the second signal from the fourth cable to the second cable such that the second signal from the third node can be sent over the fourth cable and the second cable to the first node; wherein the first node is configured to obtain information indicative of a signal quality of the first signal, and to switch from the first cable to the second cable based on the signal quality.

Example 21 includes a method comprising: sending a first signal from a first node to a second node on a first wired link; at the second node, coupling the first signal from the first wired link to a third wired link; receiving the first signal at a third node on the third wired link; at the first node, obtaining information indicative of a signal quality of the first signal; at the first node, switching from the first wired link to a second wired link based on the signal quality; sending a second signal from the third node to the second node on a fourth wired link; at the second node, coupling the second signal from the fourth wired link to the second wired link; and receiving the second signal at the first node.

What is claimed is:

1. A first node of a distributed antenna system configured to communicate with at least one second node of the distributed antenna system, the at least one second node being remote from the first node, the first node comprising:
   first and second optical-signal ports configured to receive first and second input optical signals via first and second fiber paths, respectively;
   an optical switch having first and second switch ports coupled to the first and second optical-signal ports, having a third switch port, and configured to couple, selectively, the first input optical signal or the second input optical signal to the third switch port in response to a quality of one of the first and second input optical signals on a single path;
   an optical transceiver configured to receive the coupled one of the first and second input optical signals from the third switch port and to convert the coupled one of the first and second input optical signals into a first electrical signal; and
   an interface circuit configured to convert the first electrical signal into an output RF signal.

2. The first node of claim 1 wherein the interface circuit is configured to couple the output RF signal to an antenna.

3. The first node of claim 2, wherein:
   the interface circuit is configured to receive an input RF signal from the antenna and to convert the input RF signal into a second electrical signal;
   the optical transceiver is configured to convert the second electrical signal into an output optical signal and to couple the output optical signal to the third switch port; and
   the optical switch is configured, selectively, to couple the output optical signal to one of the first and second optical ports in response to the quality of one of the first and second input optical signals.

4. The first node of claim 2, further comprising:
   third and fourth optical-signal ports configured to provide first and second output optical signals to the at least one second node of the distributed antenna system via third and fourth fiber paths, respectively;
   wherein the optical switch circuit includes fourth and fifth switch ports respectively coupled to the third and fourth optical-signal ports, and includes a sixth switch port;
   wherein the interface circuit is configured to receive an input RF signal from the antenna and to convert the input RF signal into a second electrical signal;
   the optical transceiver is configured to convert the second electrical signal into a third output optical signal and to couple the third output optical signal to the sixth switch port; and the optical switch is configured, selectively, to couple the third output optical signal to one of the third and fourth optical-signal ports in response to the quality of one of the first and second input optical signals.

5. The first node of claim 1, further comprising a quality circuit configured:
to determine the quality of the one of the first and second input optical signals that the optical switch is coupling to the third switch node; and
to toggle the optical switch to couple the other of the first and second input optical signals to the third switch node in response to the quality circuit determining that the quality of the one of the first and second input optical signals is below a quality threshold.

6. The first node of claim 1, further comprising:
third and fourth optical-signal ports configured to provide first and second output optical signals to third and fourth fiber paths, respectively;
wherein the optical switch circuit includes fourth and fifth switch ports respectively coupled to the third and fourth optical-signal ports, and includes a sixth switch port;
wherein the interface circuit is configured to receive an input RF signal and to convert the input RF signal into a second electrical signal;
the optical transceiver is configured to convert the second electrical signal into a third output optical signal and to couple the third output optical signal to the sixth switch port; and
the optical switch is configured, selectively, to couple the third output optical signal to one of the third and fourth optical-signal ports in response to the quality of one of the first and second input optical signals.

7. The first node of claim 6, further comprising a quality circuit configured:
to determine the quality of the one of the first and second input optical signals that the optical switch is coupling to the third switch node; and
to toggle the optical switch to couple the other of the first and second input optical signals to the third switch node, and to couple the third output optical signal to another one of the third and fourth optical-signal ports, in response to the quality circuit determining that the quality of the one of the first and second input optical signals is below a quality threshold.

8. A first node of a distributed antenna system, the first node comprising:
first and second optical-signal ports configured to receive first and second input optical signals from at least one second node of the distributed antenna system via first and second fiber paths, respectively, the at least one second node being remote from the first node;
an optical switch having first and second switch ports coupled to the first and second optical-signal ports, having a third switch port, and configured to couple, selectively, the first input optical signal or the second input optical signal to the third switch port in response to a quality of one of the first and second input optical signals determined in response to a measurement taken at a single circuit;
an optical transceiver configured to receive the coupled one of the first and second input optical signals from the third switch port and to convert the coupled one of the first and second input optical signals into a first electrical signal; and
an interface circuit configured to convert the first electrical signal into an output RF signal.

9. A method, comprising:

receiving, via first and second optical paths, first and second input optical signals at first and second optical-signal ports, respectively, of a first node of a distributed antenna system;
determining a quality of one of the first and second input optical signals along one and only one signal path;
coupling, selectively, the first input optical signal or the second input optical signal to an optical transceiver in response to the determined quality of the one of the first and second input optical signals;
converting, with the optical transceiver, the coupled one of the first and second input optical signals into a first electrical signal; and
converting the first electrical signal into an output RF signal.

10. The method of claim 9 wherein receiving the first and second input optical signals includes receiving the first and second optical signals from at least one second node of the distributed antenna system, the at least one second node located remote from the first node.

11. The method of claim 10, further comprising:
receiving, from an antenna, an input RF signal at the first node;
converting the input RF signal into a second electrical signal;
converting, with the optical transceiver, the second electrical signal into an output optical signal; and
coupling, selectively and in response to the determined quality of one of the first and second input optical signals, the output optical signal to the at least one second node via one of third and fourth fiber paths respectively coupled to third and fourth optical-signal ports of the first node.

12. The method of claim 9, further comprising:
coupling the output RF signal to an antenna; and
radiating a transmission signal with the antenna in response to the output RF signal.

13. The method of claim 9, further comprising:
receiving, at the first node, an input RF signal from an antenna;
converting the input RF signal into a second electrical signal;
converting, with the optical transceiver, the second electrical signal into an output optical signal;
coupling, selectively, the output optical signal to one of the first and second optical ports in response to the quality of one of the first and second input optical signals.

14. The method of claim 9, further comprising:
determining the quality of the one of the first and second input optical signals coupled to the optical transceiver; and
coupling the other of the first and second input optical signals to the optical transceiver in response to determining that the quality of the one of the first and second input optical signals is below a quality threshold.

15. The method of claim 9, further comprising:
receiving an input RF signal at the first node;
converting the input RF signal into a second electrical signal;
converting, with the optical transceiver, the second electrical signal into an output optical signal; and
coupling, selectively and in response to the quality of one of the first and second input optical signals, the output optical signal to one of third and fourth fiber paths respectively coupled to third and fourth optical-signal ports of the first node.

16. The method of claim 15, further comprising
coupling the other of the first and second input optical signals to the optical transceiver, and coupling the output optical signal to another one of the third and fourth fiber paths, in response to determining that the quality of the one of the first and second input optical signals is below a quality threshold.

17. A distributed antenna system, comprising:
at least one first node;
a second node configured to communicate with, and being remote from, the at least one first node, the second node comprising
    first and second optical-signal ports configured to receive first and second input optical signals via first and second fiber paths, respectively,
    an optical switch having first and second switch ports coupled to the first and second optical-signal ports, having a third switch port, and configured to couple, selectively, the first input optical signal or the second input optical signal to the third switch port in response to a quality of a single branch of one of the first and second input optical signals,
    an optical transceiver configured to receive the coupled one of the first and second input optical signals from the third switch port and to convert the coupled one of the first and second input optical signals into an electrical signal, and
    an interface circuit configured to convert the electrical signal into an output RF signal.

18. The distributed antenna system of claim 17 wherein:
the at least one first node includes at least one remote node; and
the second node includes a hub.

19. A non-transitory computer-readable medium storing instructions that, when executed by at least one computing circuit, cause the at least one computing circuit, or at least one other circuit responsive to the at least one computing circuit:
    to receive, via first and second optical paths, first and second input optical signals at first and second optical-signal ports, respectively, of a first node of a distributed antenna system;
    to couple, selectively, the first input optical signal or the second input optical signal to an optical transceiver in response to the quality of one of the first and second input optical signals at a location along a single path;
    to convert, with the optical transceiver, the coupled one of the first and second input optical signals into an electrical signal; and
    to convert the electrical signal into an output RF signal.

20. A distributed antenna system, comprising:
a first node;
a second node coupled to the first node via a first cable and a second cable;
a third node coupled to the second node via a third cable and a fourth cable;
wherein the first node is configured to transmit a first signal over the first cable; and
    wherein the second node is configured to couple the first signal from the first cable to the third cable such that the first signal from the first node can be sent over the first cable and third cable to the third node;
wherein the third node is configured to transmit a second signal over the fourth cable, and wherein the second node is configured to couple the second signal from the fourth cable to the second cable such that the second signal from the third node can be sent over the fourth cable and the second cable to the first node;
wherein the first node is configured to obtain information indicative of a signal quality of the first signal from a single path, and to switch from the first cable to the second cable based on the signal quality.

21. A method comprising:
sending a first signal from a first node to a second node on a first wired link;
at the second node, coupling the first signal from the first wired link to a third wired link;
receiving the first signal at a third node on the third wired link;
along one and only one signal path of the first node, obtaining information indicative of a signal quality of the first signal as the first signal propagates along the one and only one signal path;
at the first node, switching from the first wired link to a second wired link based on the signal quality;
sending a second signal from the third node to the second node on a fourth wired link;
at the second node, coupling the second signal from the fourth wired link to the second wired link; and
receiving the second signal at the first node.

* * * * *